United States Patent [19]
Shimomura et al.

[11] Patent Number: 5,495,542
[45] Date of Patent: Feb. 27, 1996

[54] BINARY TO MULTI-LEVEL IMAGE RESTORATION USING NEURAL NETWORK

[75] Inventors: Yukari Shimomura, Yokohama; Susumu Sugiura, Atsugi; Takeshi Kobayashi, Yokohama, all of Japan

[73] Assignee: Canon Kabushiki Kaisha, Tokyo, Japan

[21] Appl. No.: 302,092

[22] Filed: Sep. 7, 1994

Related U.S. Application Data

[63] Continuation of Ser. No. 140,962, Oct. 25, 1993, abandoned, which is a continuation of Ser. No. 673,240, Mar. 20, 1991, abandoned.

[30] Foreign Application Priority Data

| Mar. 23, 1990 | [JP] | Japan | 2-072118 |
| Mar. 23, 1990 | [JP] | Japan | 2-072119 |
| Jun. 14, 1990 | [JP] | Japan | 2-153934 |

[51] Int. Cl.$^6$ ................................. G06K 9/40
[52] U.S. Cl. ........................... 382/254; 382/156
[58] Field of Search ............... 382/50–54, 56, 382/14, 15; 341/67, 98, 104, 125; 358/453, 456, 462, 464, 466; H04N 1/40, 1/04; G06K 9/36, 9/38, 9/40, 9/46

[56] References Cited

U.S. PATENT DOCUMENTS

| 4,803,436 | 2/1989 | Grossberg et al. | 382/54 |
| 4,803,558 | 2/1989 | Hiratsuka et al. | 358/283 |
| 4,860,026 | 8/1989 | Matsumoto et al. | 346/1.1 |
| 4,905,097 | 2/1990 | Watanabe et al. | 358/456 |
| 4,905,294 | 2/1990 | Sugiura et al. | 382/9 |
| 4,926,180 | 5/1990 | Anastassiou | 341/125 |
| 4,926,268 | 5/1990 | Kawamura et al. | 358/456 |
| 4,972,187 | 11/1990 | Wecker | 341/104 |
| 4,995,090 | 2/1991 | Singh et al. | 382/50 |
| 5,005,206 | 4/1991 | Naillon et al. | 382/56 |

FOREIGN PATENT DOCUMENTS

| 61-281676 | 12/1986 | Japan | H04N 1/40 |

OTHER PUBLICATIONS

"Using Neural Networks in Pattern Recognition, Signal Processing and Knowledge Processing", in *Nikkei Electronics*, No. 427, pp. 115–124 (PTO Translation).

"Image Modification of Color Hard Copies Using Neural Networks" in *Image Electronics Engineers of Japan*, 1989, pp. 13–18 (PTO Translation).

Kolias, S. et al. "Image Halftoning and Reconstruction Using a Neural Network", *ICASSP*, vol. 3, May 26, 1989, pp. 1787–1790.

Kulkarni, A. D. "Neural Nets for Image Restoration", Annual Computer Science Conference Proceedings, Feb. 22, 1990 pp. 373–378.

*Primary Examiner*—Jose L. Couso
*Attorney, Agent, or Firm*—Fizpatrick, Cella, Harper & Scinto

[57] ABSTRACT

Use is made of a neural network in order to restore a binary image to an original multi-level image, by way of example. Using the neural network makes it possible to raise the accuracy of restoration and the speed of processing.

10 Claims, 27 Drawing Sheets

FIG. 1A
(PRIOR ART)

| -1 | -1 | -1 |
|----|----|----|
| -1 | 8  | -1 |
| -1 | -1 | -1 |

FIG. 1B

| 10 | 10 | 10 | 10 | 10 |
|----|----|----|----|----|
| 10 | 10 | 10 | 10 | 10 |
| 10 | 10 | 10 | 10 | 10 |
| 10 | 10 | 10 | 10 | 10 |
| 10 | 10 | 10 | 10 | 10 |

FIG. 1C

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 1 | 0 |
| 0 | 0 | 0 | 0 | 0 |

8

−3

6

−3

−2

7

−8

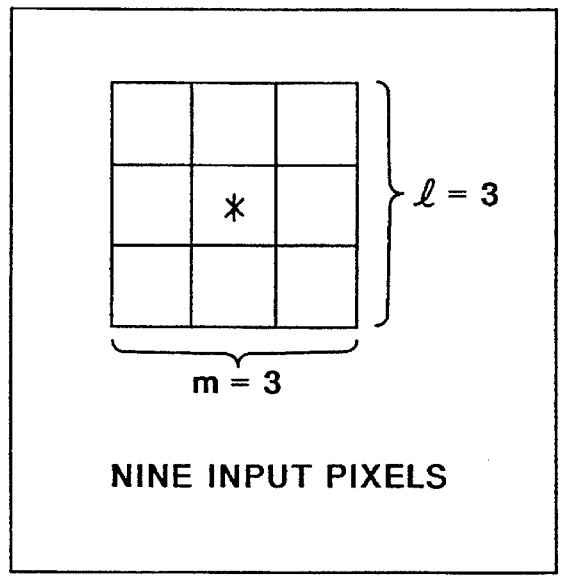
*: PIXEL OF INTEREST
BINARY IMAGE
F I G. 6A
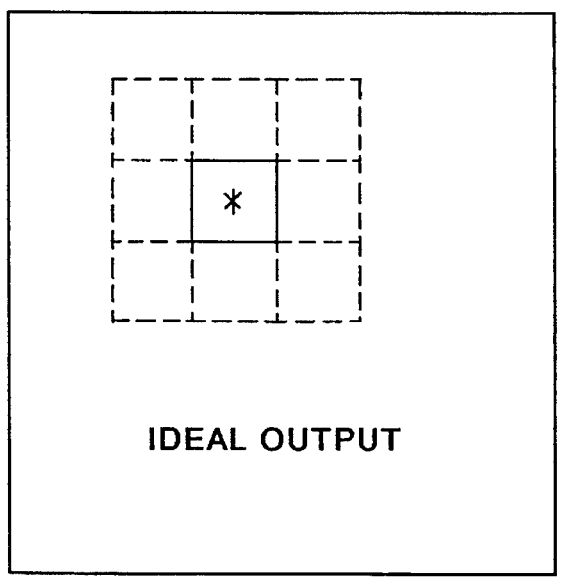
*: PIXEL OF INTEREST
MULTI-LEVEL IMAGE
F I G. 6B

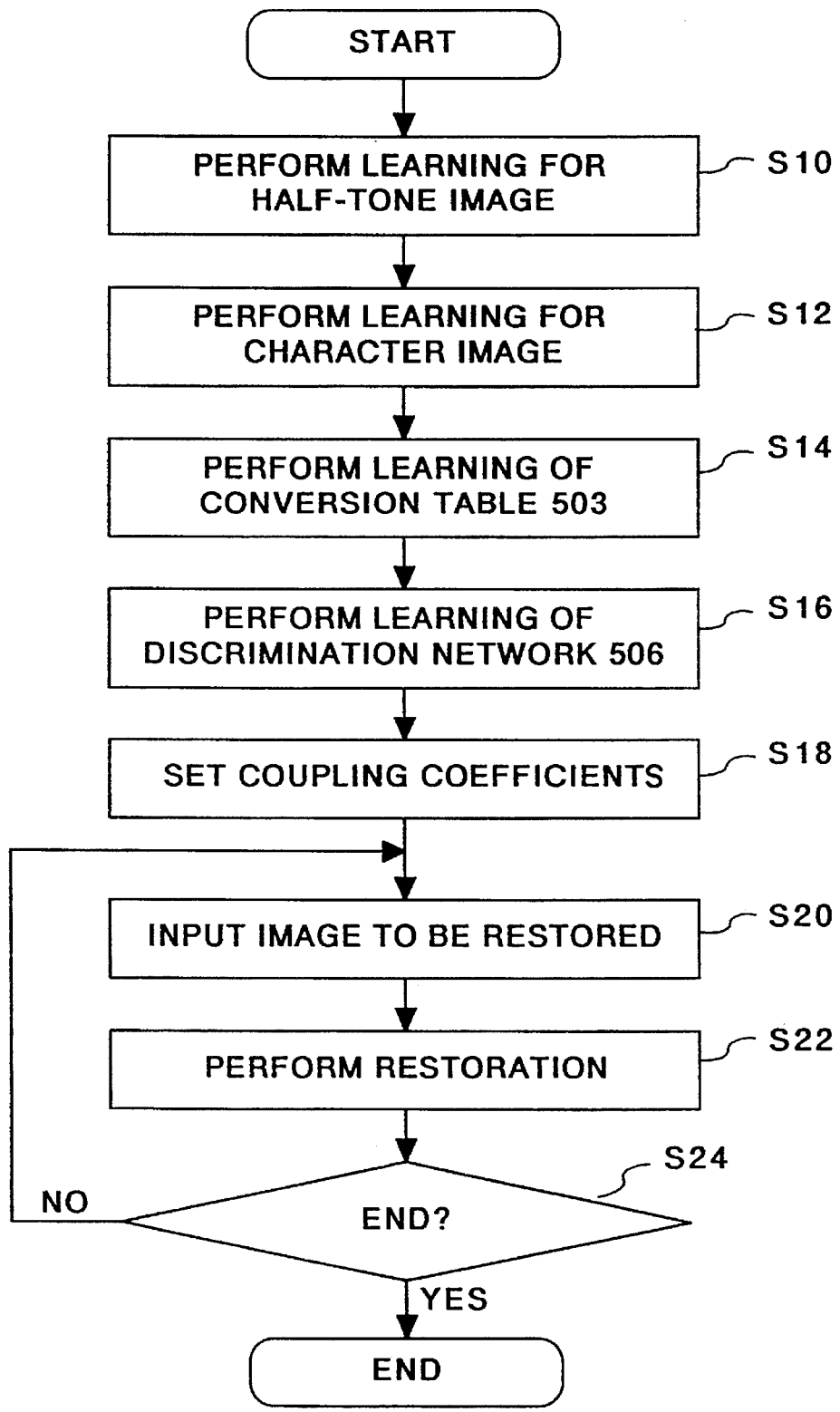
F I G. 11

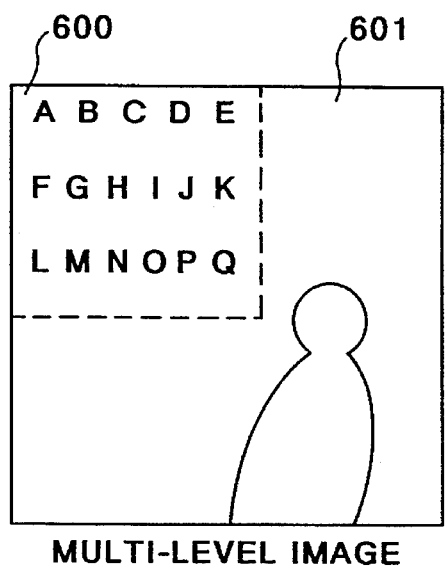
MULTI-LEVEL IMAGE
F I G. 13A
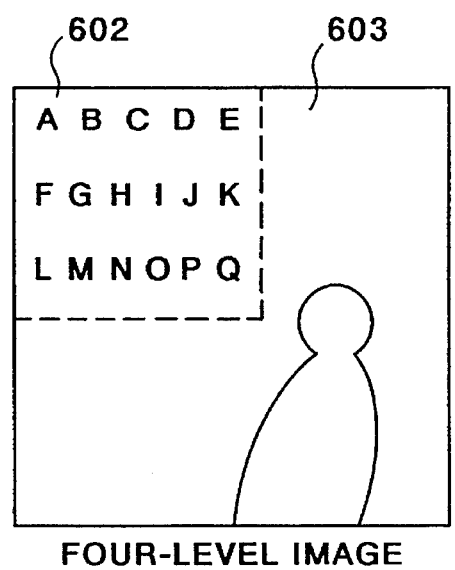
FOUR-LEVEL IMAGE
F I G. 13B
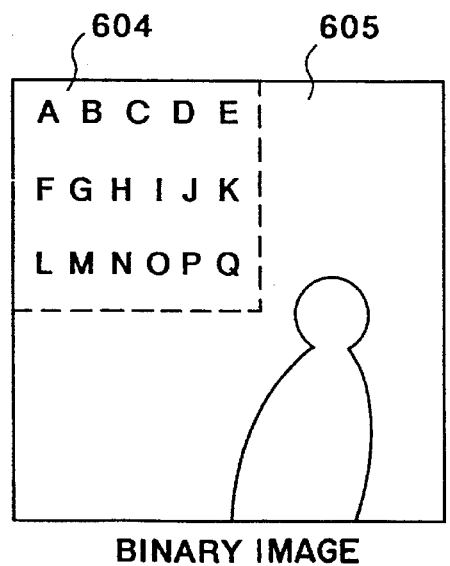
BINARY IMAGE
F I G. 13C
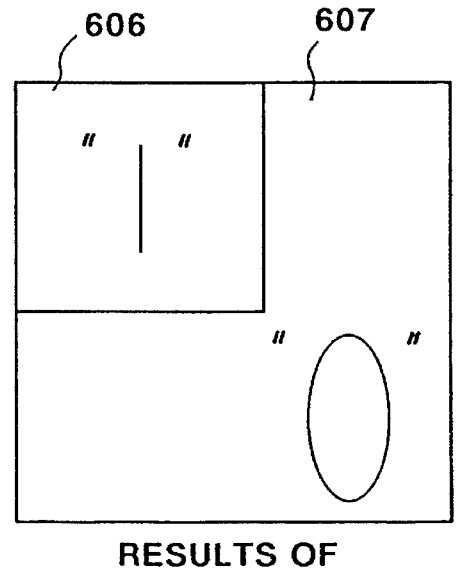
RESULTS OF DISCRIMINATION
F I G. 13D

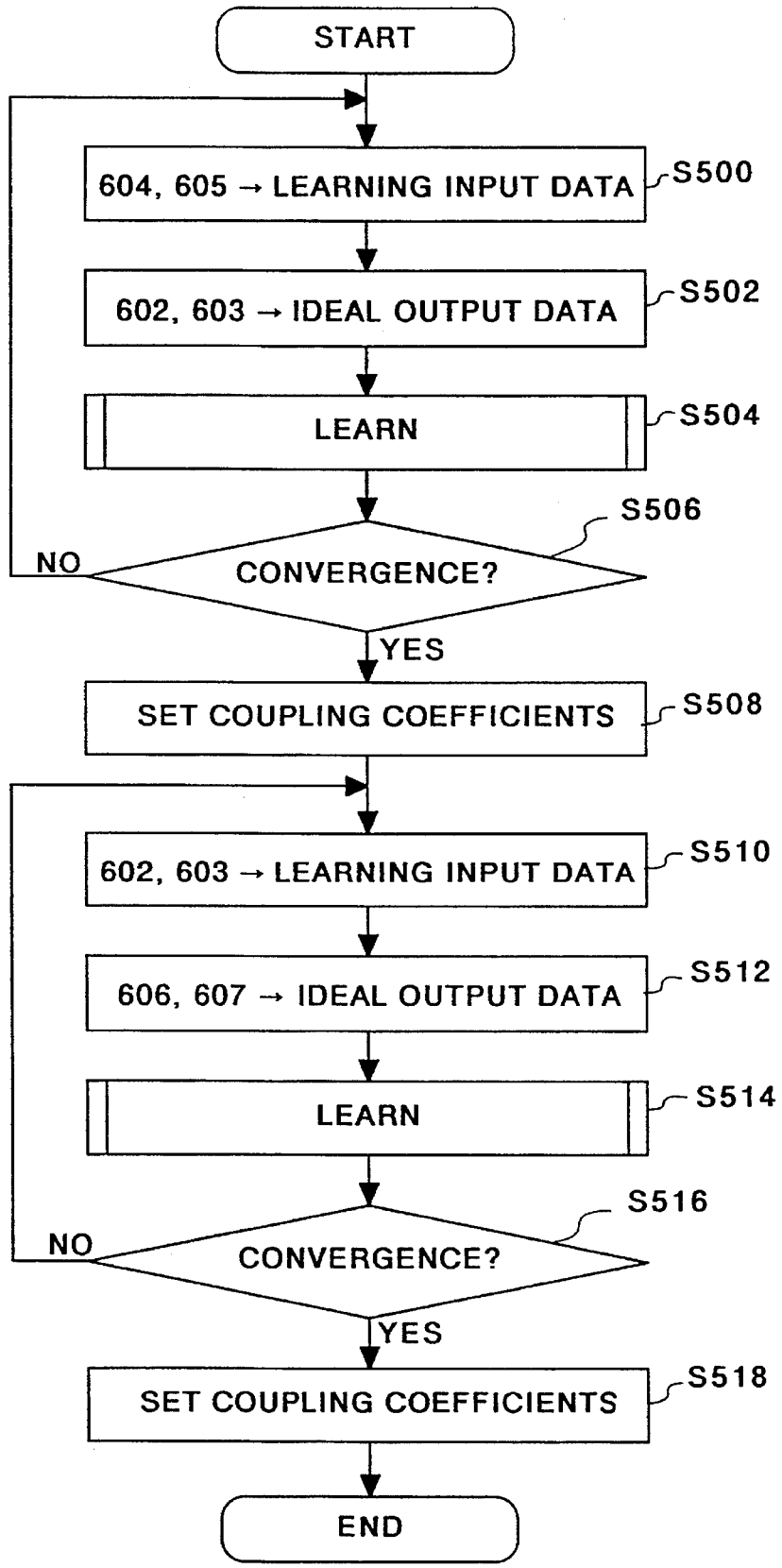
F I G. 15

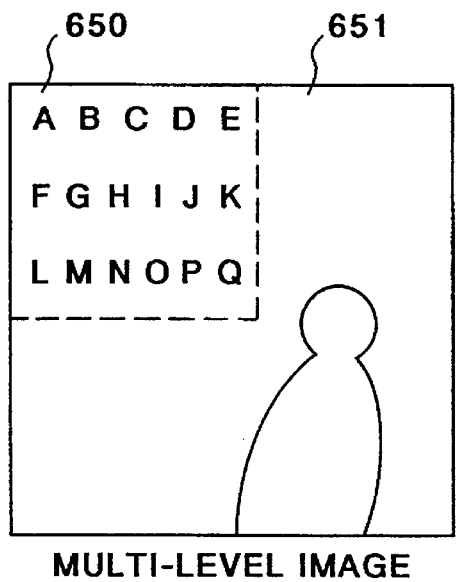
FIG. 22A  MULTI-LEVEL IMAGE
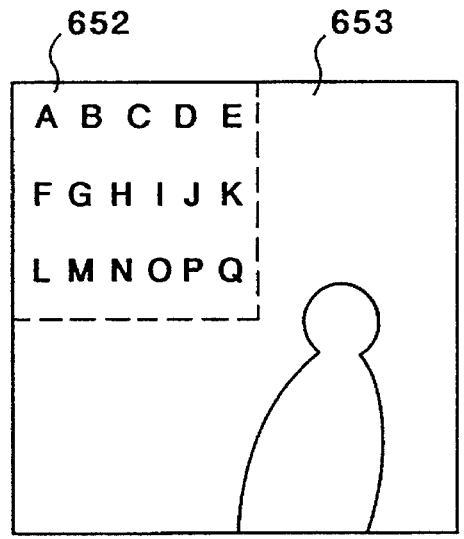
FIG. 22B  EIGHT-LEVEL IMAGE
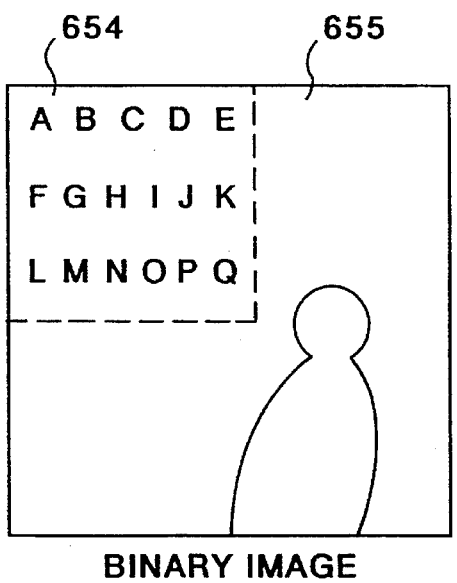
FIG. 22C  BINARY IMAGE

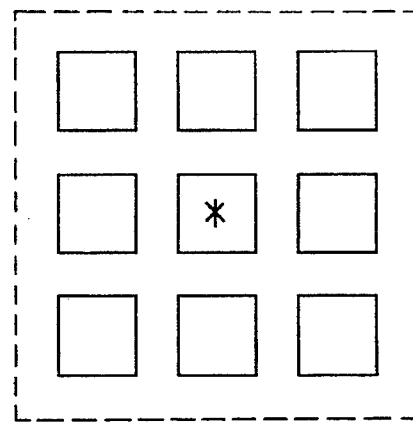
FIG. 24A  ☐ FINAL REFERENCE PIXEL
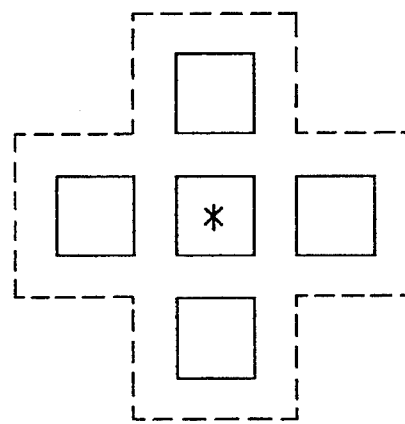
FIG. 24B  ☐ FINAL REFERENCE PIXEL
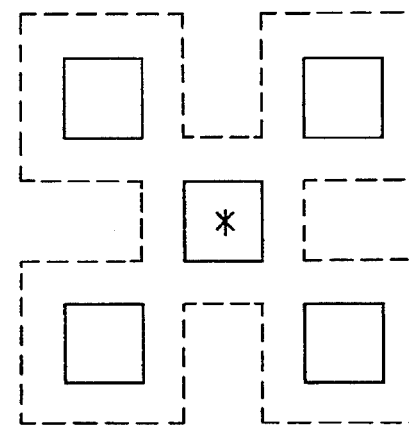
FIG. 24C  ☐ FINAL REFERENCE PIXEL

BINARY TO MULTI-LEVEL IMAGE RESTORATION USING NEURAL NETWORK

This application is a continuation of application Ser. No. 08/140,962, filed Oct. 25, 1993, now abandoned, which was a continuation of application Ser. No. 07/673,240, filed Mar. 20, 1991 now abandoned.

BACKGROUND OF THE INVENTION

This invention relates to image processing using a neural network. More particularly, the invention relates to an image processing method and apparatus for converting an N-level image (N bits per pixel) into M-level image data (M bits per pixel; M>N) such as a method and apparatus for restoring binary (two-level) image data to original multilevel image data. The invention further relates to a method and apparatus for subjecting an input image to image discrimination, and to a learning method in a neural network used in the above-described image processing.

In conventional facsimile and copying machines, an original multi-level image (e.g., one color, eight bits per pixel) is read by a CCD, subjected to an A/D conversion to reduce the number of bits to a two-level or N-level (N<8) bit number, and the resulting data is transmitted or recorded. The number of bits may need to be reduced because, for example, the band of the transmission line is too narrow or because only two-level recording is possible on the recording side. Even today when transmission lines often are ISDNs and bandwidth is broader than that of conventional public telephone lines, considerable time and cost are required in order to transmit single-color, eight-bit multi-level image data.

On the recording side, on the other hand, reduction in the price of laser printers and progress in techniques for pulse modulation of recording exposure are making it possible to perform multi-level recording with excellent cost performance. In addition, it is becoming possible for the CRTs used in personal computers, work stations and the like to present 16-tone black-and-white displays and 256-color multitone displays.

Accordingly, important industrial advantages are obtained if, on the transmitting side, the original multi-level image can be binary-converted and the resulting binary (two-level) image data can be transmitted after being compressed and, on the receiving side, the received image data can be expanded and the original multi-level image can be estimated and restored in some form from the binary image data obtained.

In relation to the prior art of this type, the specification of Japanese Patent Application Laid-Open No. 61-281676 discloses a method in which an original multi-level image is binary-converted using a dither matrix comprising an N×M matrix, and the resulting binary image data is converted on the receiving side into multi-level image data by performing pattern matching with a known N×M matrix. The received binary image contains a character area and an image area that contains half tones. Though it is desired that both areas be restored from the received binary image in a form close to the original image, the image restored by pattern matching with the conventional N×M matrix is a smoothened image which is blurred and exhibits poor reproduced quality.

The reason for the above problem is as follows: Since density is not preserved in the inputted binary image data binary-converted by the dither method, the data obtained from this binary image data by estimating the original multiple values contains many errors. As a result, the binary image binary-converted by the dither method readily suffers image degradation at the fine lines of characters and the like. In other words, in essence it is difficult with simple pattern matching to restore a binary image, which is obtained by a binary converting method that essentially involves loss of information, into the original multi-level image. In a case where the original multi-level image is widely divergent in terms of the type and degree of picture quality, the type and degree of the binary image subsequently obtained by binary conversion also are widely divergent. Accordingly, essentially it is necessary to take into consideration this divergence in the restoration method.

Since the original image thus contains character images and half-tone images, whether the input binary image was binary-converted from a character image or restored from a half-tone image should be determined (i.e., image discrimination should be performed) at the time of restoration. Simple black and white image (without gray tones) is referred to as "character image". In order to separate a half-tone image area and a character image area from a binary image in the prior art, an edge detection filter of the kind shown in FIG. 1A is used. If such a half-tone image as in FIG. 1B is binarized, isolated dots may appear as shown in FIG. 1C. The shaded portions in FIGS. 2A through 2G are "1"s. When an edge detection operation is applied to binary images as shown in FIGS. 2A to 2G applying the filter shown of FIG. 1A and using |4| as a threshold, isolated dots (FIGS. 2A and 2G) are likely to be misjudged as being character portions, because the only values in a binary image are the extremal values "1" and "0" which is different from what is to be expected in a half-tone image.

SUMMARY OF THE INVENTION

An object of the present invention is to provide an image processing method and apparatus capable of performing image restoration which takes the diversity of an input image into account by relying upon "learning" using a neural network not seen in the prior art.

According to the present invention, the foregoing object is attained by providing an image processing method for restoring input N-level image data to M-level image data by estimating an original image, comprising the steps of:

a: preparing M-level image data of an original image as an ideal output and N-level image data as an input, these items of data being for a neural network;

b: inputting these items of N-level and M-level image data to a neural network as input image data and an ideal output, respectively, and learning a coupling coefficient between neurons of the neural network; and c: inputting input N-level image data, which is to be restored, to the neural network under the learned coupling coefficient, and adopting the output M-level image data as restored image data.

More specifically, in accordance with the restoration method and apparatus of the present invention, character areas and half-tone image areas, for example, are learned using a neural network in order to estimate the original multi-level data, and multi-level image data is estimated using learning parameters. As a result, character portions are restored to a multi-level image sharply, and tone portions of the image are restored to a multi-level image smoothly with little granularity.

In accordance with an embodiment of the present invention, the method further includes a step of performing image discrimination to discriminate half-tone images and character images.

Another object of the present invention is to provide an image restoration method having excellent restoration accuracy.

According the present invention, the foregoing object is attained by providing an image restoration method for restoring an input N-level image to an M-level image (N<M), comprising the steps of:

(a) forming an m-level (N<m) image by referring to pixels in a window having a size of a×b provided in the input N-level image;

(b) sampling pixels from the m-tone image at a predetermined interval; and (c) generating an M-level image by subjecting sampled m-level pixel data to tone processing relying upon a first neural network, and adopting this M-level image as a restored image of the N-level image.

More specifically, by sampling an m-level image at a predetermined interval, the area which the first neural network refers to is enlarged. That is, the accuracy of restoration is raised while the scope of the neural network is kept small.

Still another object of the present invention is to provide an image processing method in which a portion such as a character portion can be reproduced in a form faithful to the original image.

In order to estimate multi-level image data effectively from binary image data, it is desired that the density of the multi-level image of the original be preserved also in the image data resulting from the binary conversion. However, since density is not preserved in binary image data binarized by the dither method, the multi-level data estimated from this binary image data contains many errors. As a result, the binary image binary-converted by the dither method readily suffers image degradation at the fine lines of characters and the like. In a case such as this, the neural network is especially effective. Accordingly, in a preferred embodiment of the present invention, N-level image data for learning, and which is the object of restoration, is converted into N-level image data using a density preserving-type N-level conversion method.

In a preferred embodiment of the present invention, learning of the neural network is performed by a back-propagation method.

A further object of the present invention is to provide a learning method of a neural network in an image processing apparatus which uses the neural network, in which the learning method reconciles both an improvement in learning efficiency and assured accuracy.

In accordance with this learning method, the neural network is divided into two stages, in which after learning of the neural network of the first stage is performed, learning of the neural network of the second stage is carried out.

A further object of the present invention is to provide an image discrimination method using a neural network, as well as a learning method of this neural network.

According to the present invention, this object is attained by providing an image discrimination method for separating and detecting a half-tone image area and a character image area in an inputted N-level image, comprising the steps of:

(a) forming an m-level (N<m) image by referring to pixels in a window having a size of a×b provided in the input N-level image;

(b) sampling pixels from the m-tone image at a predetermined interval; and (c) inputting sampled m-level pixel data to a first neural network and outputting results of image discrimination from the neural network.

According to this method, the number of pixels referred to in order to perform image discrimination is substantially increased to improve the accuracy of the image discrimination.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 1A is a diagram for describing the structure of a filter for detecting an image area according to the prior art;

FIG. 1B is a diagram illustrating an example of a half-tone image;

FIG. 1C is a diagram illustrating the results of binarizing the image of FIG. 1B by the filter of FIG. 1A;

FIGS. 6A and 6B are diagrams for describing image data used in learning of the neural network of the restoring unit in the apparatus of the embodiment shown in FIG. 3;

FIG. 11 is a flowchart illustrating the procedure of learning and restoration processing in the restoring unit

FIGS. 13A through 13D illustrate a procedure for creating learning data used in learning of the image discriminator 113;

FIG. 15 is a flowchart for describing a learning process in the image discriminator 113;

FIGS. 22A through 22C are diagrams for describing a process for creating image data for learning used in the embodiment of FIG. 18;

FIGS. 24A through 24C are diagrams for describing various variations of the arrangement of reference pixels relating to a modification of restoration.

DESCRIPTION OF THE PREFERRED EMBODIMENTS

An embodiment in which an image processing method utilizing a neural network according to the present invention is applied to a facsimile apparatus will now be described with reference to the accompanying drawings. In this embodiment, use is made of a back-propagation method as an example of a learning method in a neural network which uses binary image data as received N-level image data to estimate multi-level image data from this binary image data. Furthermore, in order to generate binary image data from an original image, use is made of binary image data obtained by employing a density-preserving-type binarization method, namely an error diffusion method (hereinafter referred to as "ERD") in binarization processing. This is for the purpose of making possible high-quality restoration when restoration is carried out.

Figure 2A:
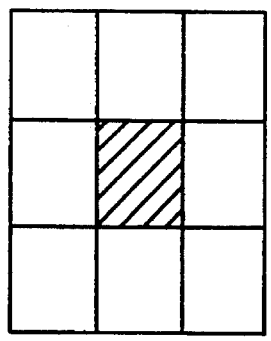
FIGS. 2A through 2G are diagrams for describing a problem which arises owing to the filter of FIG. 1A.
Figure 2B:
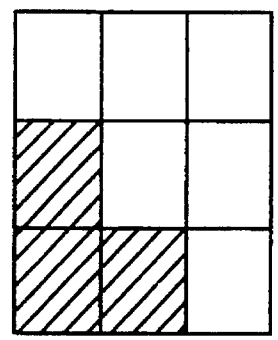
Figure 2C:
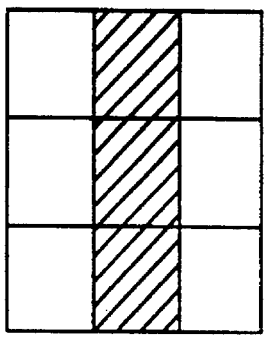
Figure 2D:
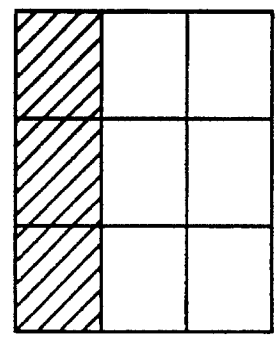
Figure 2E:
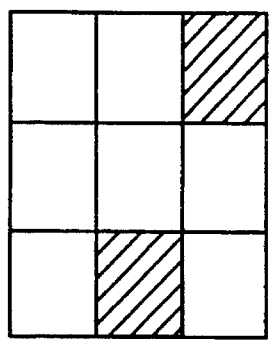
Figure 2F:
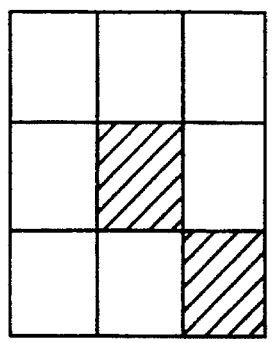
Figure 2G:
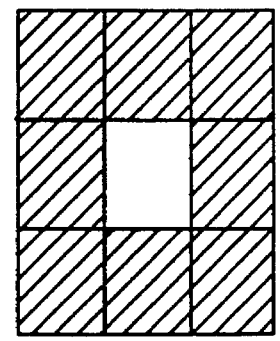
Figure 3:
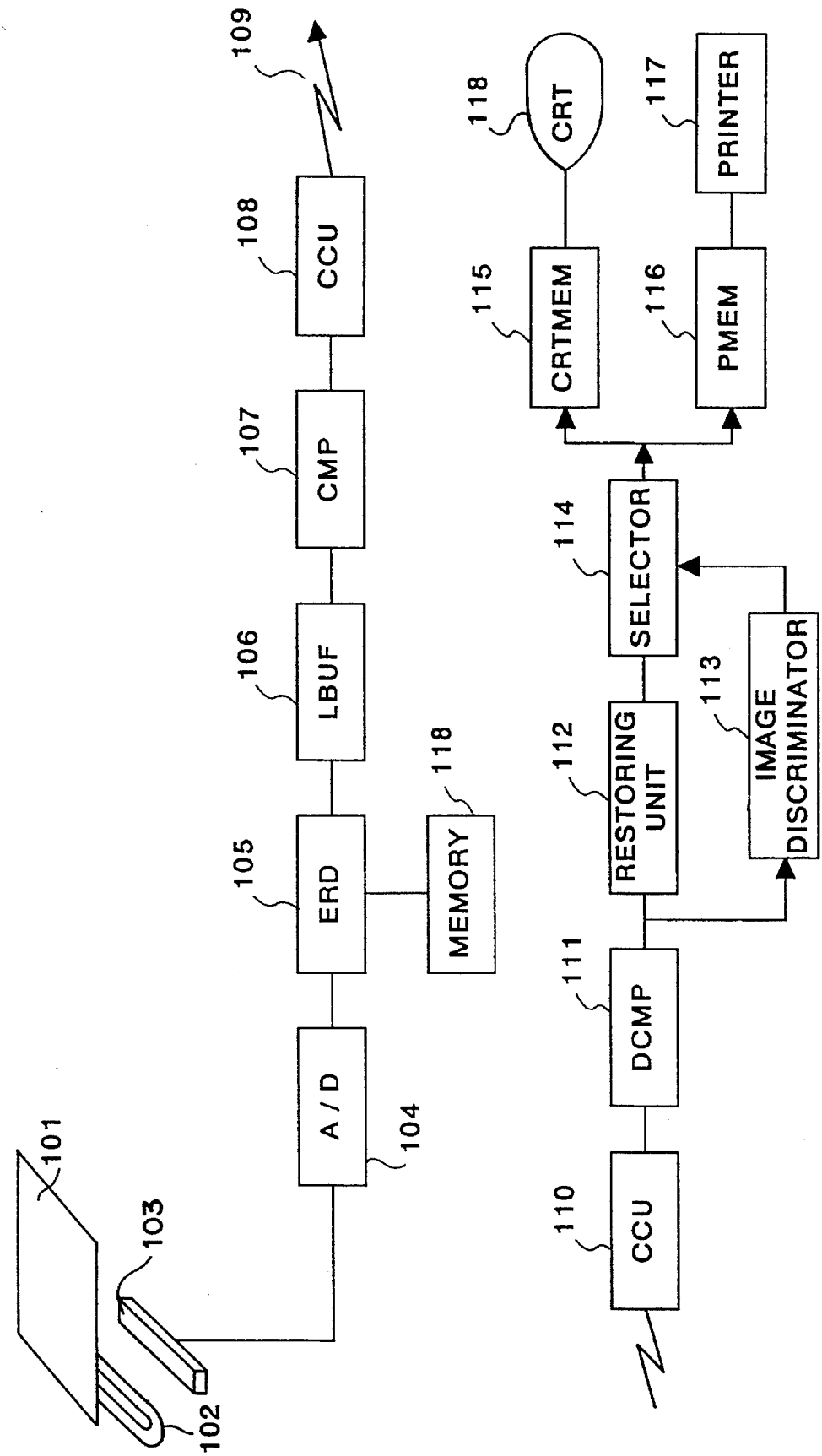
FIG. 3 is a block diagram showing the construction of an embodiment in which the present invention is applied to a facsimile apparatus.

The image processing method of the present invention is achieved by a restoring unit 112 and an image discriminator 113, shown in FIG. 3. The method of restoration employed in the restoring unit 112 is characterized by the feature that use is made of a neural network. In addition, a neural network is used also in the discriminator 113. An improved version of the restoring unit 112 will be described later in greater detail.

<Apparatus of the Embodiment>

FIG. 3 is a block diagram illustrating a facsimile apparatus as one example of the apparatus embodying the present invention. As shown in FIG. 1, an original image has been recorded on an original document 101, which is irradiated by light from a light source 102. A CCD 103 for photoelectric conversion is connected to an A/D converter 104 which digitizes an analog signal from the CCD 103. Ordinarily, eight bits are used in processing of multi-level data.

A binarizing (two-level conversion) processor 105 employs a density preserving-type error diffusion method (ERD). For an explanation of ERD, see Floyd and Steinberg, SID, International SYMP. Syp. Digest of Technical Papers 4–3, April 1975. This ERD is such that an excellent binary-converted image can be realized. A memory 118 stores error diffusion information from a previous cycle of error diffusion.

The image data binarized by the ERD 105 enters a buffer memory 106 having a capacity of several lines, and the data outputted by the buffer memory 106 is compressed by a compressing circuit (CMP) 107. The compressing method is an internationally standardized MR or MMR compressing method, or the like. The compressed data is transmitted to the receiving side through a communication unit (CCU) 108 for a digital line, or a modem for an analog line. Numeral 109 denotes an ISDN or a public telephone network.

A CCU 110 on the receiving side is the same as the CCU 108 on the transmitting side and serves as a demodulator. A DCMP 111 decompresses (expands) the received compressed data and sends the decompressed data to a restoring unit 112. The latter restores multi-level image data from the binary image data stored in buffer 106. As will be described below, the restoring unit 112 has two neural networks the construction of which is illustrated in FIG. 4. Of the two neural networks, one is for half-tone images and the other is for character images. More specifically, the restoring unit 112 outputs restored results (multi-level data), obtained by restoring an input image as a half-tone image, and restored results (multi-level data) obtained by restoring an input image as a character image. These results are delivered to a selector 114.

Figure 17:
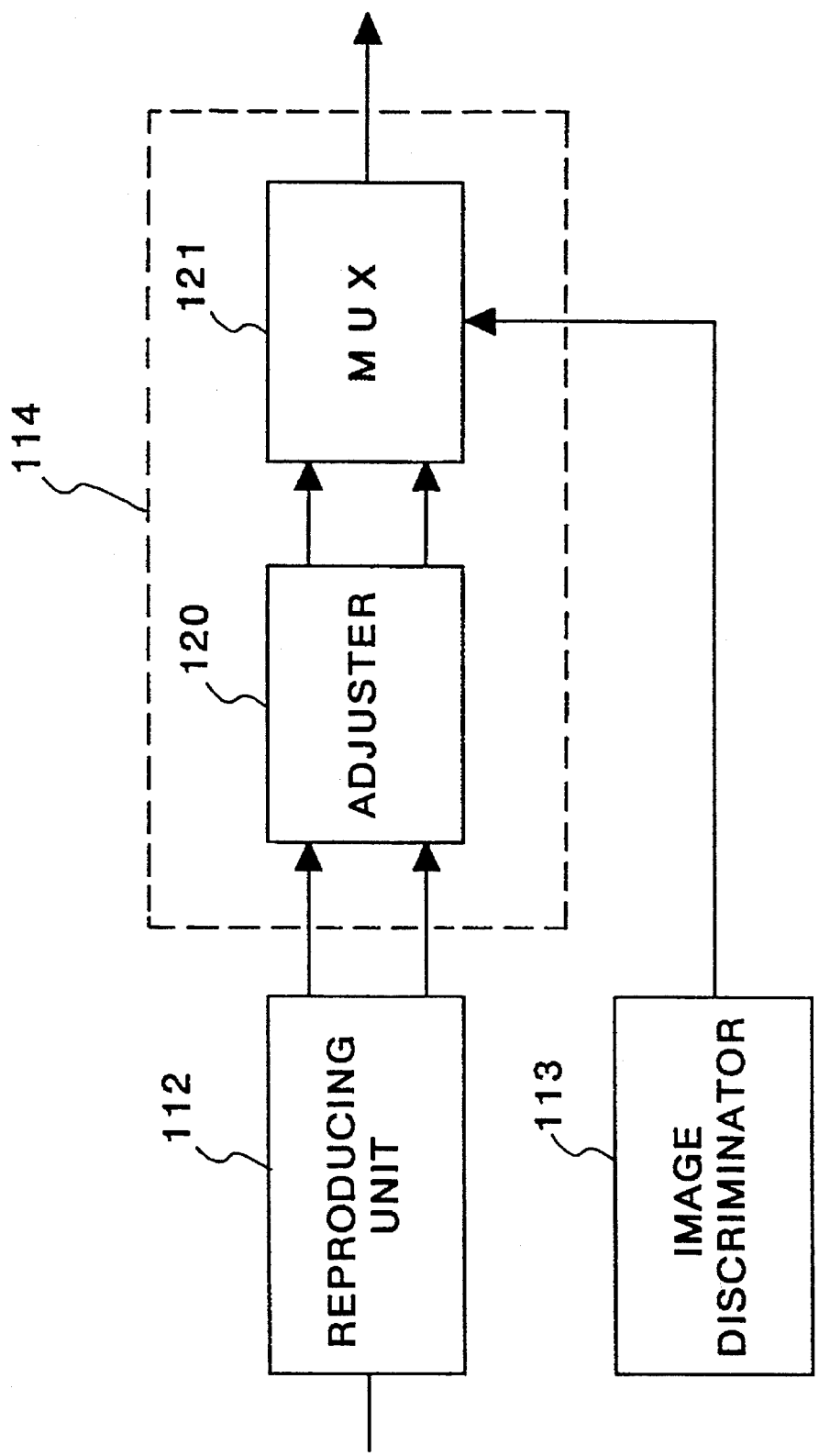
FIG. 17 is a block diagram illustrating the structure of a selector 114 in the apparatus of FIG. 3.

An image discriminator 113 of FIG. 3 subjects the image data received from the DCMP 111 to image-type discrimination and sends the results of discrimination to the selector 114. In accordance with the results of image discrimination described above, the selector 114 (the construction of which is shown in FIG. 17) selects one of the two restored results from the restoring unit 112.

The multi-level data outputted by the selector 114 enters a memory 115 of a CRT 118 capable of a multi-level display, and a memory 116 for a recorder 117 capable of multi-level recording. The multi-level images restored for the CRT 118 and printer 117 are displayed and printed in accordance with the data in the memories 115, 116.

(Neural Network of the Restoring Unit)

The concept of a neural network is described in detail in "Using Neural Networks in Pattern Recognition, Signal Processing and Knowledge Processing" (*Nikkei Electronics*, Aug. 10, 1987), by way of example. In this specification, neural networks will be described in sufficient scope to facilitate an understanding of the invention.

Figure 4A:
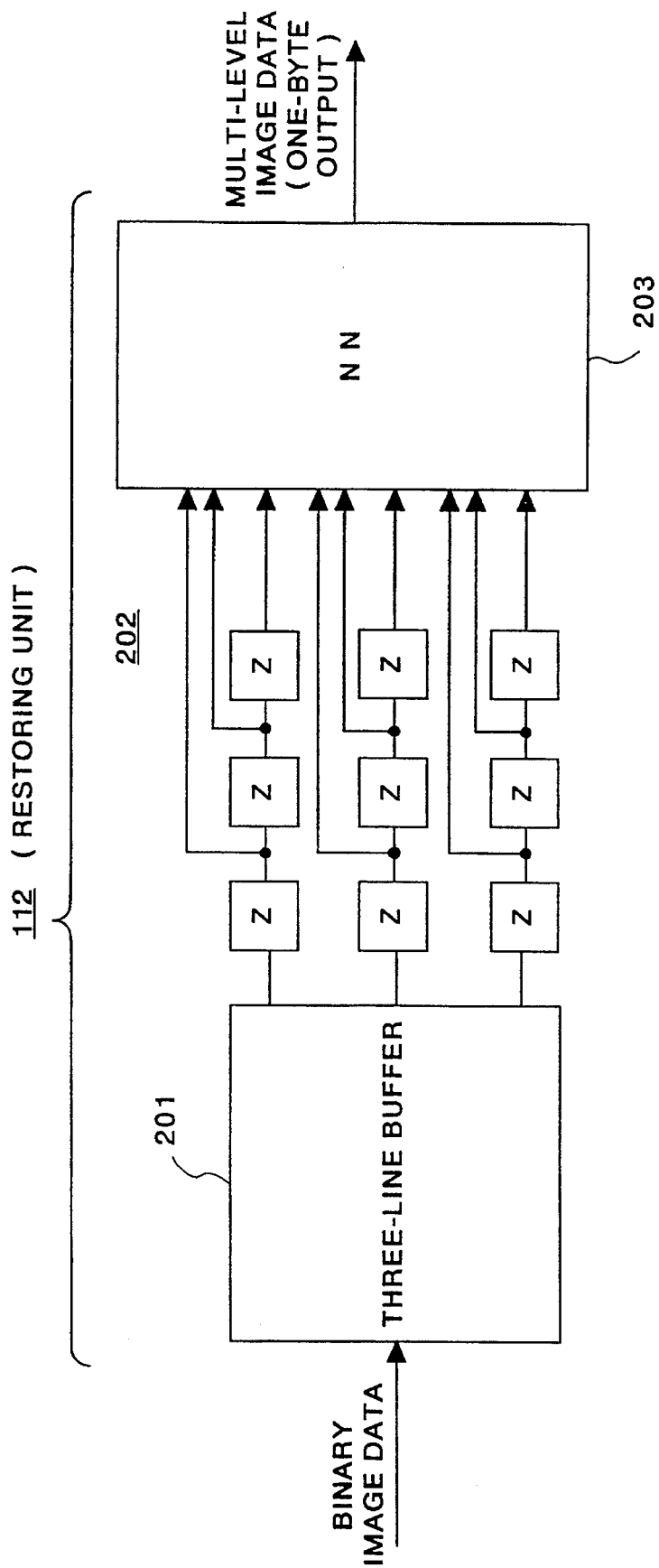
FIG. 4A is a diagram for describing a restoring unit in the embodiment of FIG. 3.
Figure 5A:
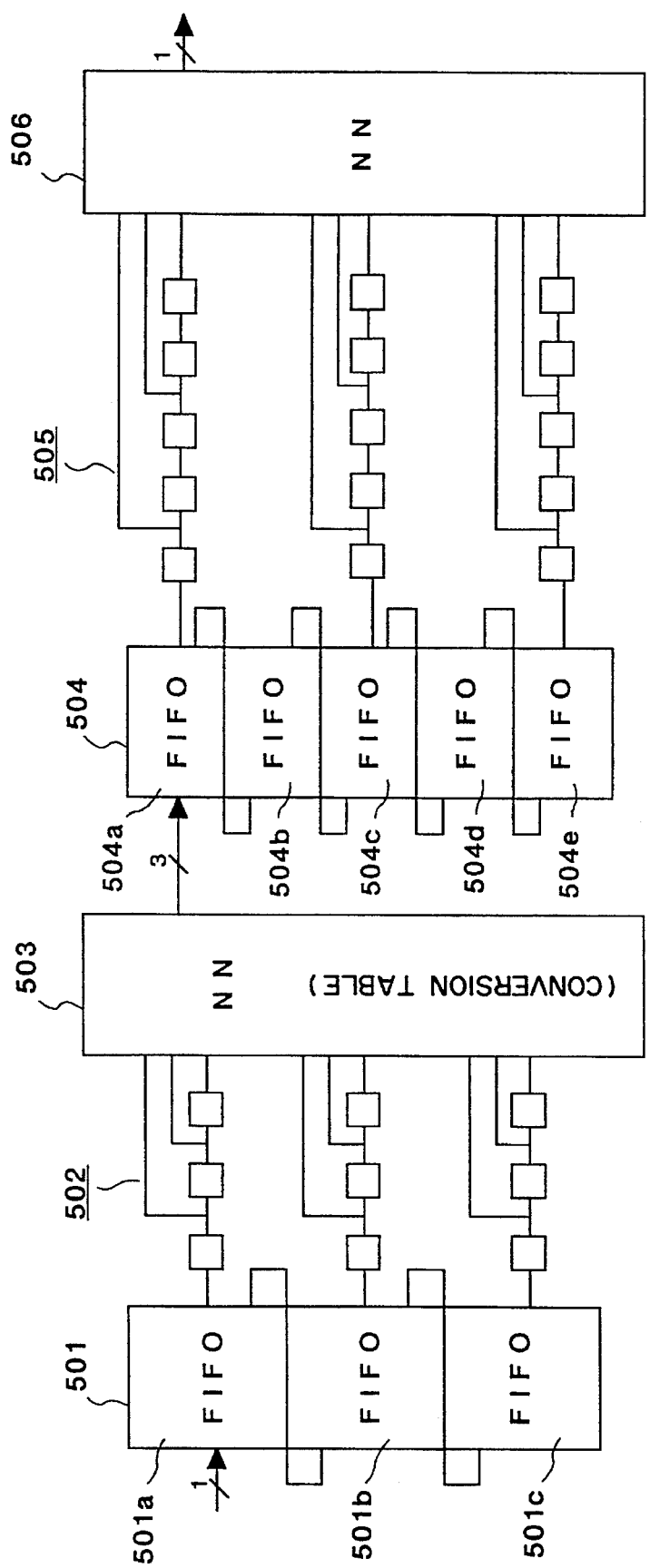
FIG. 5A is a block diagram illustrating the construction of an image discriminator 113 in the apparatus of FIG. 3.

FIG. 4A illustrates an example of the construction of a neural network in the restoring unit 112. The restoring unit 112 has two networks, one for a half-tone image and one for a character image. Since the two networks are identical in construction, that for the half-tone image is illustrated in FIG. 4A. FIG. 5A illustrates an example of the construction of a network in the discriminator 113. The network of the restoring unit 112 and that of the discriminator 113 are substantially similar in structure. Accordingly, FIG. 4A will be used in order to describe the structure of the neural networks.

A neural network 203 shown in FIG. 4A has a line memory 201 for three lines of data in order to restore a multi-level image by referring to a 3×3 window block.

The three-line buffer 201 stores data in three consecutive lines in the vertical direction of the image. In the three lines of data, items of data from the left end to the right end of the same horizontal position are successively outputted to a delay-element (latch) group 202 in synchronism with a clock. When this is done, data in a small 3×3 area in horizontal and vertical directions as shown in FIG. 6A is latched in the latch group 202. The latch group 202 comprises nine latches the output of each of which enters the neural network (NN) 203. In accordance with a two-level→ multi-level conversion performed by the NN 203, image data in the form of a pixel at a position (indicated by "*" in FIG. 6B) corresponding to the central pixel of the small block is outputted by the NN 203. In the present embodiment, eight bits per pixel (256 tones), by way of example, are employed as the multi-level image data.

With the apparatus of the embodiment shown in FIG. 3, as described in connection with FIGS. 6A and 6B, a 3×3 reference area is set when the multi-level image data is restored from the binary image data. In other words, the spread of the area which causes dispersion of error at the time of the binarizing processing in the ERD 105 is prearranged to have a size of 3×3.

Figure 4B:
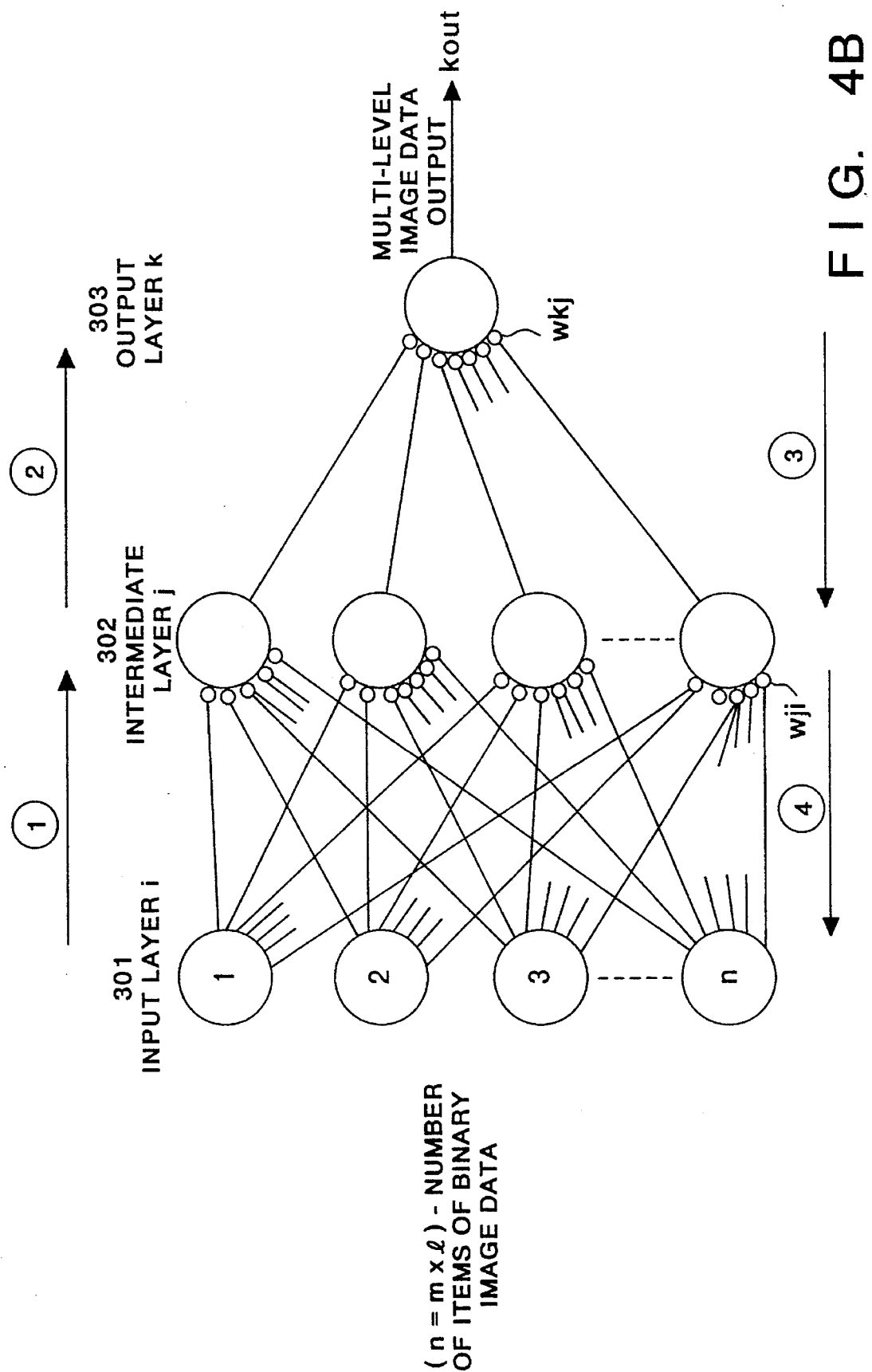
FIG. 4B is a diagram illustrating, in block form, the construction of a neural network 203 of the restoring unit
Figure 5B:
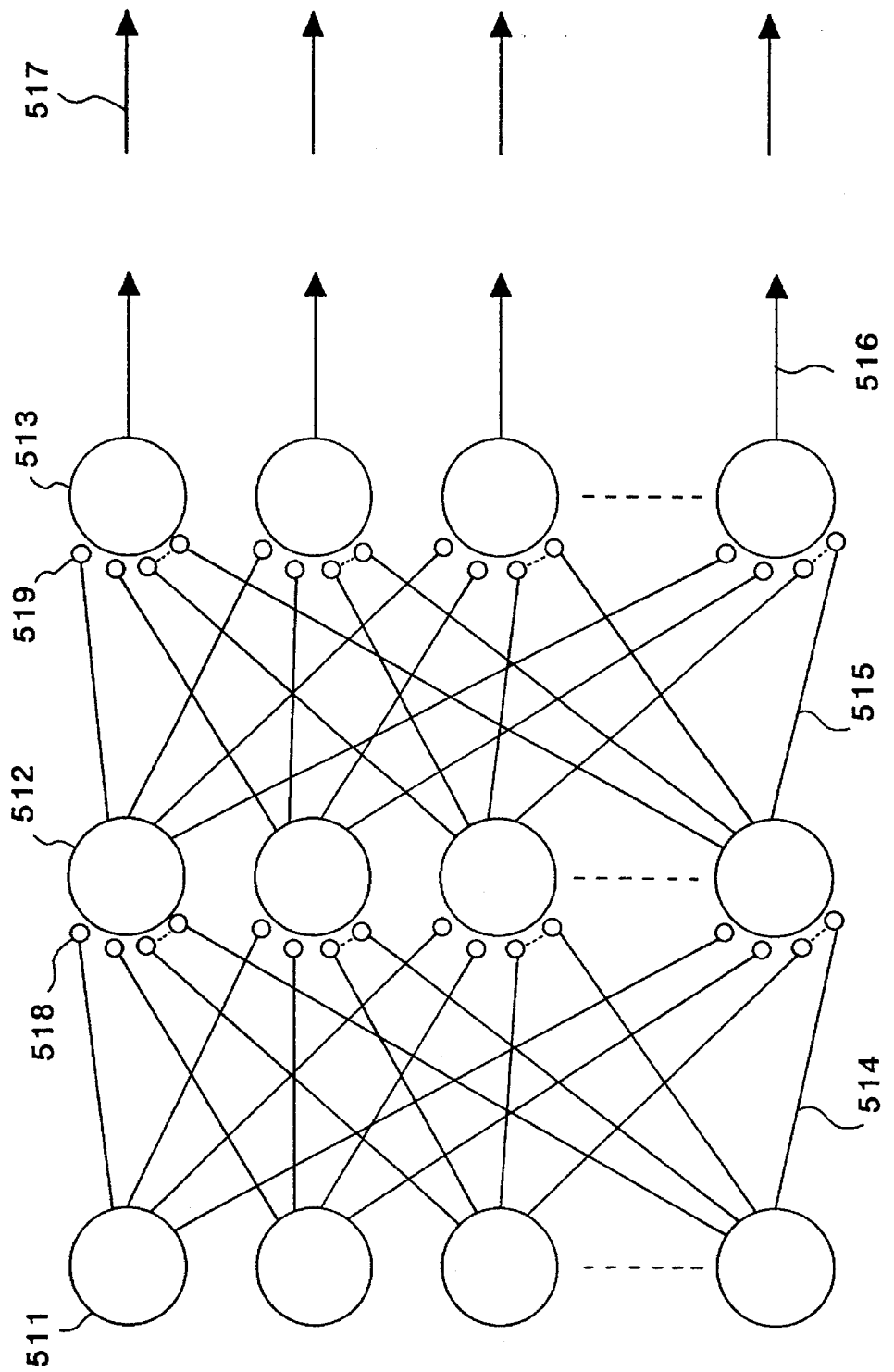
FIG. 5B is a diagram illustrating, in block form, the construction of two neural networks of the image discriminator 113.

FIG. 4B is a block diagram illustrating the construction of an example of the neural network (NN) 203 in the restoring unit 112. FIG. 5B is a block diagram illustrating the construction of an example of the neural network in the discriminator 113.

FIG. 4B will be used in order to describe the neural network in general terms. The neural network of FIG. 4B is arranged so as to be capable of dealing with a reference block having a size of n=m×1. In the examples of FIGS. 6A and 6B, m=3, 1=3, n=9. In FIG. 4B, numeral 301 denotes an input layer i, 302 an intermediate layer j, and 303 an output layer k. Accordingly, in a case where the reference block having the size (3×3) is applied to the apparatus of this embodiment, nine neurons are required as the input layer i. The numbers of neurons of the intermediate layer j should be decided in dependence upon the desired accuracy of the multi-level conversion. In this embodiment, the intermediate layer j comprises a layer of nine neurons. One neuron is required in the output layer k.

The strength of coupling between the input layer i and intermediate layer j is represented by $W_{ji}$, and the strength of coupling between the intermediate layer j and intermediate layer k is represented by $W_{kj}$.

The coupling strengths $W_{ji}$, $W_{kj}$ are decided by learning, and the accuracy of restoration performed by the neural networks is dependent upon these coupling strengths. Each neuron comprises a plurality of adders as well as a multiplier, divider and function operators (tables), not shown. If it is determined that enough learning is performed, the coupling strengths $W_{ji}$, $W_{kj}$ are decided by learning and the construction of a system is decided in the form of a neural network.

Figure 7:
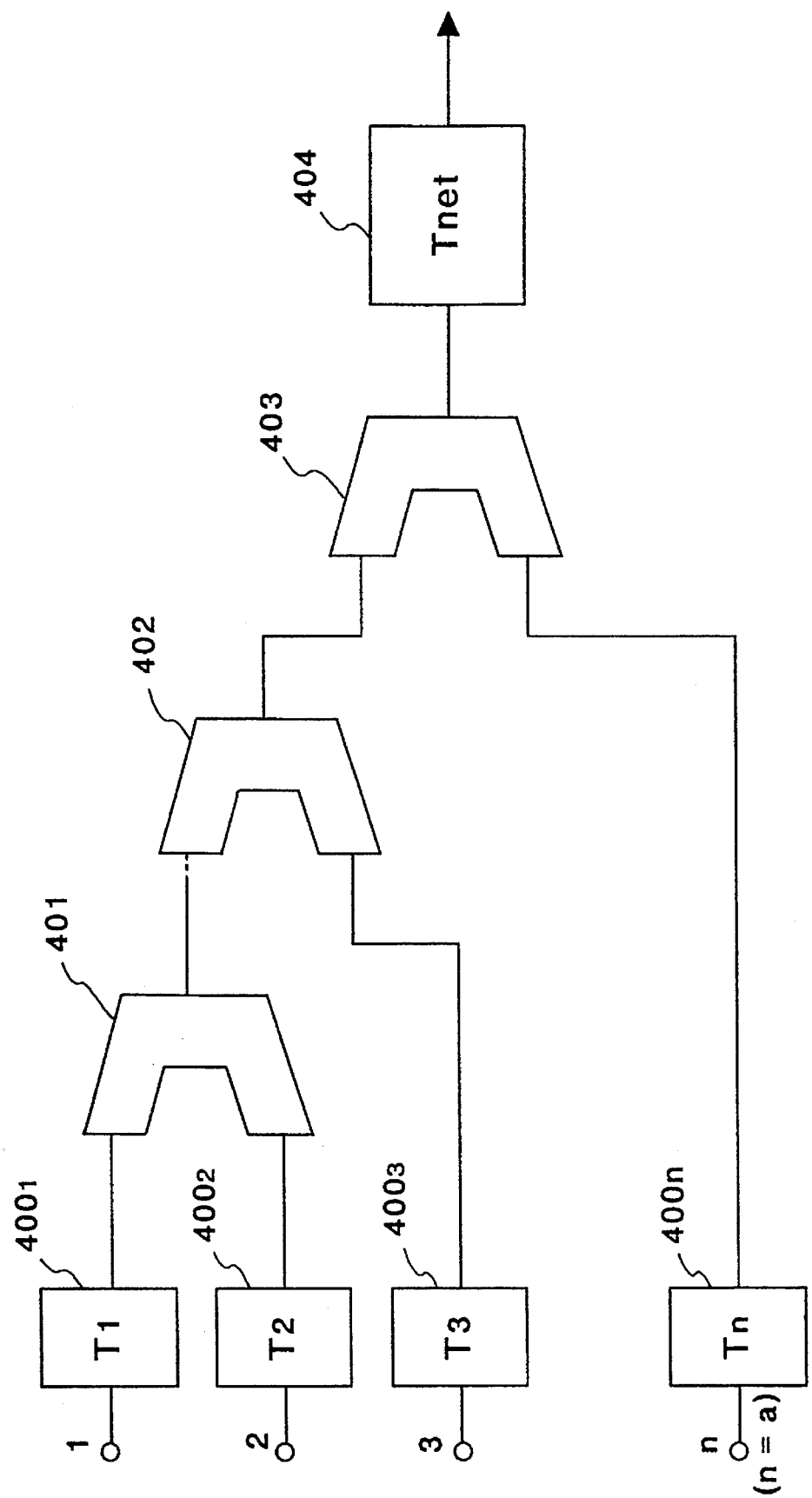
FIG. 7 is a block diagram illustrating the structure of a network in the restoring unit 112.

One neuron of the embodiment is constructed as shown in FIG. 7, by way of example. $T_1$ through $T_n$ indicated at $400_1$ through $400_n$ in FIG. 7 are look-up tables for multiplying input data by a coupling coefficient ($W_{ji}$ or $W_{kj}$). These table values are decided by learning, described below. The inputs to these tables are the outputs of the neurons ahead of them. Numerals 401 through 403 denote adders each of which adds the two inputs applied thereto. A look-up table 404 designated $T_{net}$ is a table for normalizing, by means of a sigmoid function, the sum total of the addition operations performed by the adders 401 through 403.

If each neuron is as shown in FIG. 7 and the overall network is constructed as shown in FIGS. 4B and 5B, the hardware structure is simplified and processing speed is high enough for practical use.

Figure 8:
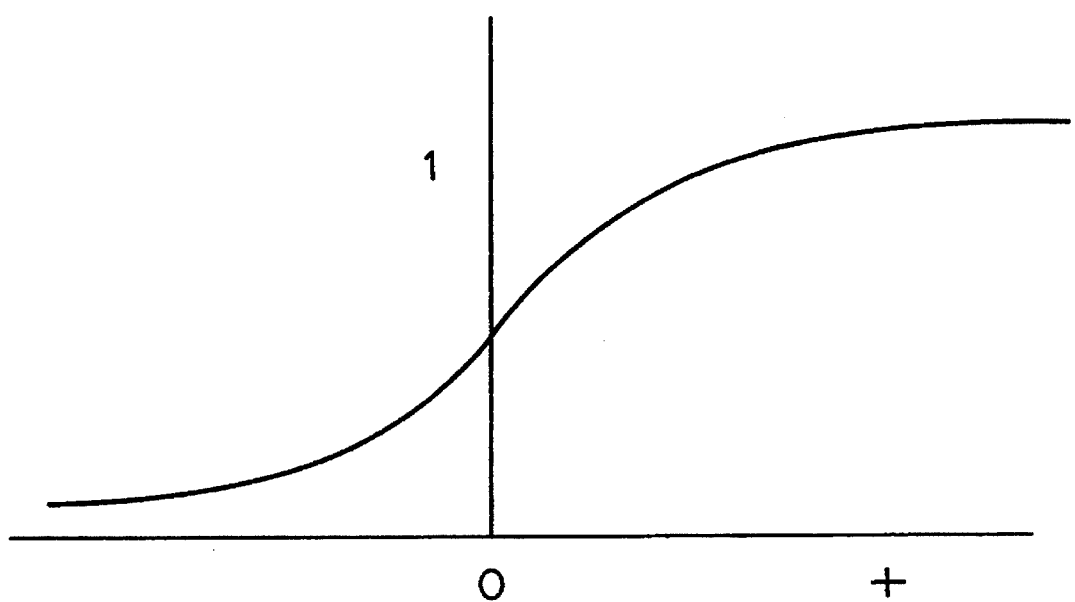
FIG. 8 is a graph illustrating an example of the characteristic of a sigmoid function used in learning of a neural network.

FIG. 8 illustrates an example of the characteristic of the sigmoid function. This function is characterized by the facts that normalization is performed in the range between "0" and "1", and that the values "0" and "1" are difficult to output.

(Neural Network of the Discriminator)

The construction of the neural network of the discriminator 113 will be described in accordance with FIG. 5A. The discriminator 113 differs from the restoring unit 112 in that the two neural networks (503, 506) are connected in series. Providing the discriminator 113 with two networks is advantageous in that the learning speed is raised and image discrimination is made more accurate.

Figure 9A:
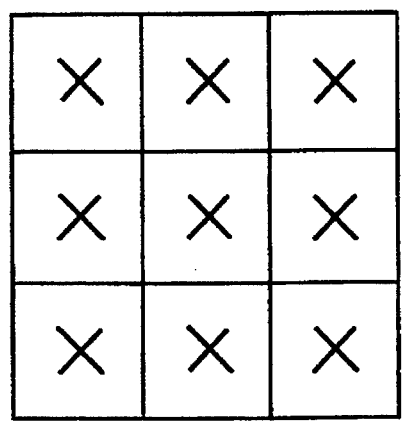
FIGS. 9A, 9B, 10A and 10B are diagrams illustrating the structures of image data used in learning by a neural network of the image discriminator 113.
Figure 9B:
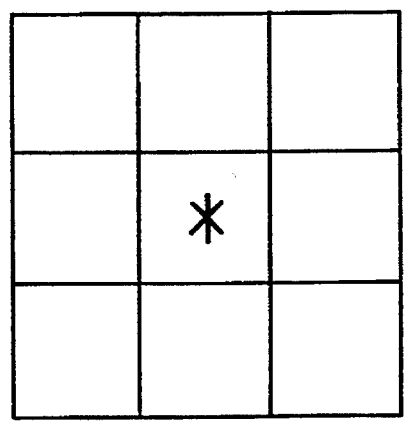

In FIG. 5A, numeral 501 denotes a three-line memory comprising FIFO memories 501a through 501c. The FIFO memories 501a through 501c store data in three consecutive lines in the vertical direction of the image. Items of data from the left end to the right end of the same horizontal position are successively outputted in synchronism with a clock. As a result, data in 3×3 small areas (windows) is latched arranged as a 3×3 array in a data latch 502 in the horizontal and vertical directions. Numeral 503 denotes a neural network for performing the function of a conversion table which carries out a tone conversion from a binary level to a multi-level valve m (m=4). This neural network converts the contents of the data latch 502 into four-tone levels. Binary image data composed of nine pixels as shown in FIG. 9A is inputted to the conversion table 503, which proceeds to output multi-level image data of a pixel of interest at the position indicated by "*" in FIG. 9B. The table 503 also comprises a neural network and therefore requires learning.

As will be described later, the inputs to the conversion table 503 are $2^9$ (=512) in number. Therefore, it is referred to as a table since it can readily be put into the form of a ROM (i.e., a table) after learning.

The 2-bit output (four tones) of the conversion table 503 enters line memories 504a through 504e of five lines. Data of five consecutive lines in the vertical direction of the image is stored in these five memories 504a through 504e of the line memory 504. Of the five lines, items of data from the left end to the right end of the same horizontal position are inputted successively. First, third and fifth lines of data are latched in the data latch 505 in synchronism with a clock, and nine items of data consisting of the first, third and fifth items of data are outputted in synchronism with the clock. These nine items of data are the inputs to the neural network 506, which outputs a signal representing the results of image discrimination corresponding to the pixel of interest (the third pixel on the middle of the three lines) among the nine items of data.

Figure 10A:
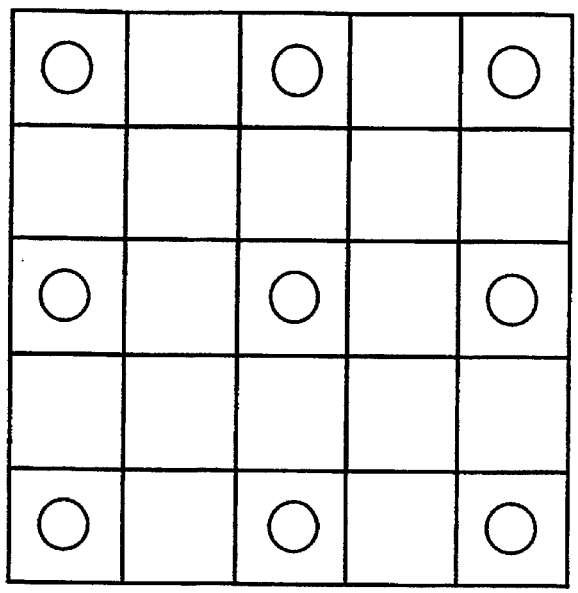
Figure 10B:
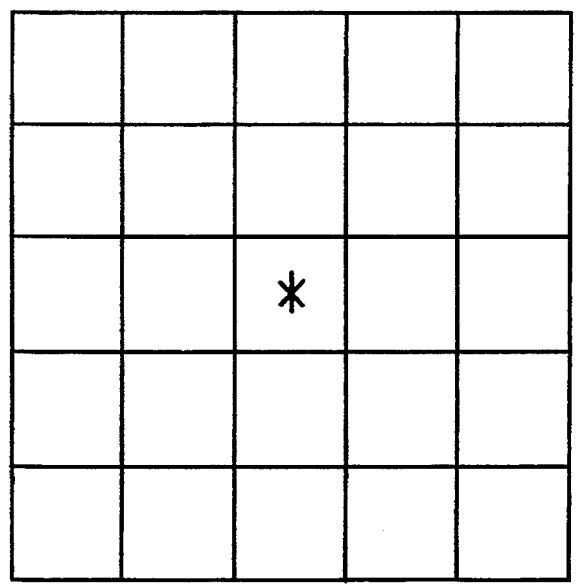

Four-level image data composed of nine pixels as shown in FIG. 10A is inputted to the neural network 506, which proceeds to output multi-level image data of a pixel of interest at the position indicated by "*" in FIG. 10B. As each pixel data in FIG. 10A refers to a block, respectively as shown in FIG. 9A, the pixel blocks referred to for the purpose of image discrimination are enlarged through the two stage process.

FIG. 5B is a diagram for describing the neural networks (503, 506) of the discriminator 113. Numeral 511 denotes an input layer composed of ii items, and the output (i-out) 514 thereof is delivered to an intermediate layer 512 (composed of j intermediate items). The output (j-out) 515 of the intermediate layer 512 is delivered to an output layer 513 (composed of k items). Numeral 516 denotes an output (k-out), which indicates the output from the output layer 513. Numeral 517 denotes an ideal output (ideal-output), and numerals 518, 519 represent weighting coefficients ($W_{ji}$, $W_{kj}$). These indicates the strengths of the connection relationships (amplification, or attenuation) between the input layer 511 and intermediate layer 512 or between the intermediate layer 512 and the output layer 513.

There is substantially no apparent difference between the networks (FIG. 4B) of the restoring unit 112 and the networks (FIG. 5B) of the discriminator 113. This is because the output layer of the discriminator network also is such that one element is enough in substance. The essential difference between the networks of the restoring unit 112 and the networks of the discriminator is the difference between the coupling constants.

<Outline of the Restoring Operation>

Restoration processing according to this embodiment will now be described with reference to the flowchart of FIG. 11. This restoration processing comprises a learning process (steps S10, S12) and an actual restoration process (steps S14 through S18).

The learning process of steps S10 through S16 includes learning by the two neural networks (for half-tone images and character images) of the restoring unit 112 and learning by the two neural networks (503 and 506) of the discriminator 113. If the coupling coefficients ($W_{ji}$) of these networks have been decided, these values are fixedly set at step S18. As a result, the characteristics of the networks of the restoring unit 112 and discriminator 113 are decided. Next, the binary image of the actual object of restoration is inputted to the restoring unit 112 at step S20. The restoring unit 112 outputs a multi-level image (step S22). The processing of steps S20, S22 is repeated as long as there is an image which is the object of restoration. <Learning>

Figure 12A:
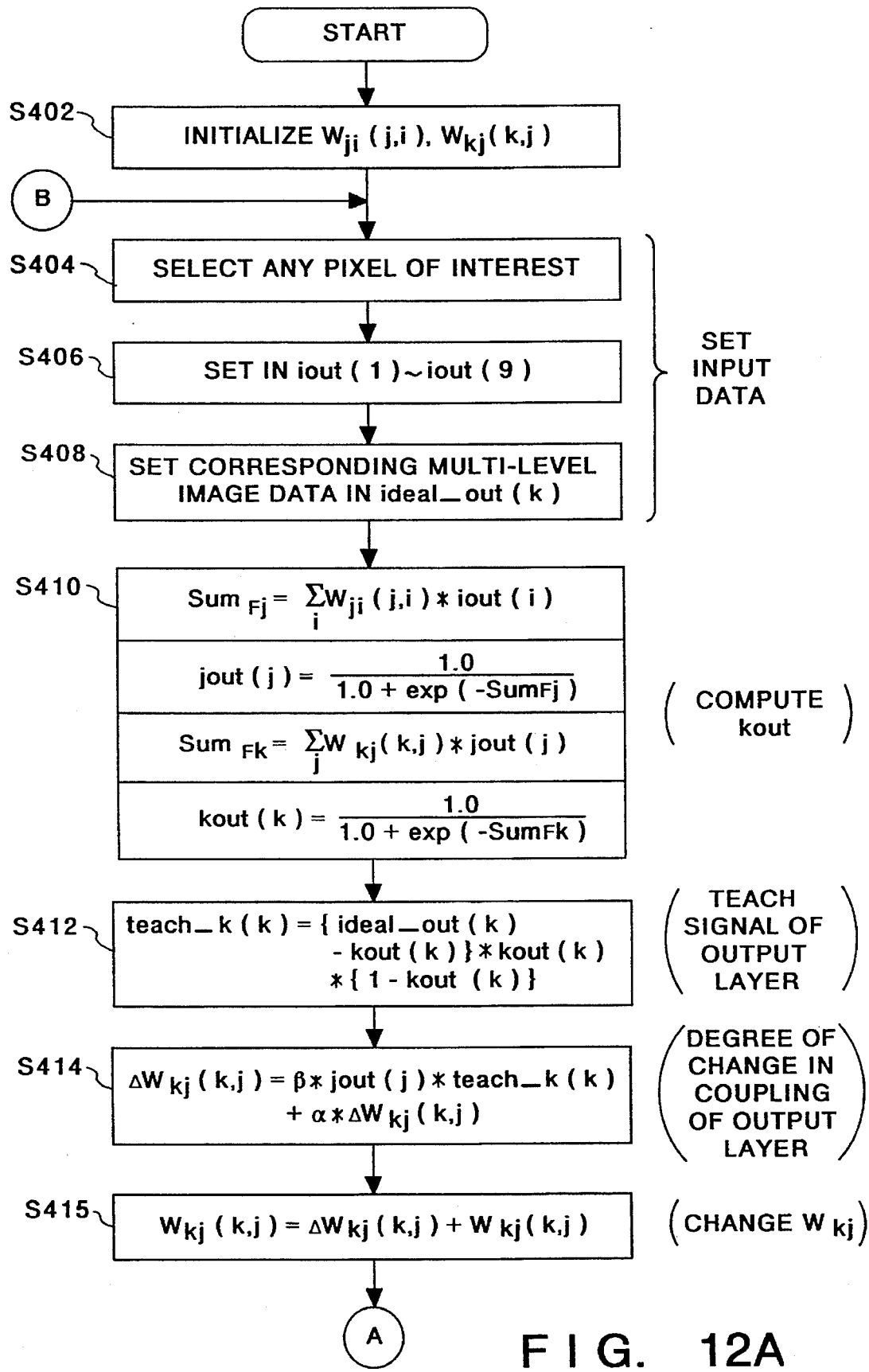
FIGS. 12A, and 12B are flowcharts illustrating the procedure of learning processing used when many neural networks employed in the apparatus of FIG. 3 are caused to learn.
Figure 12B:
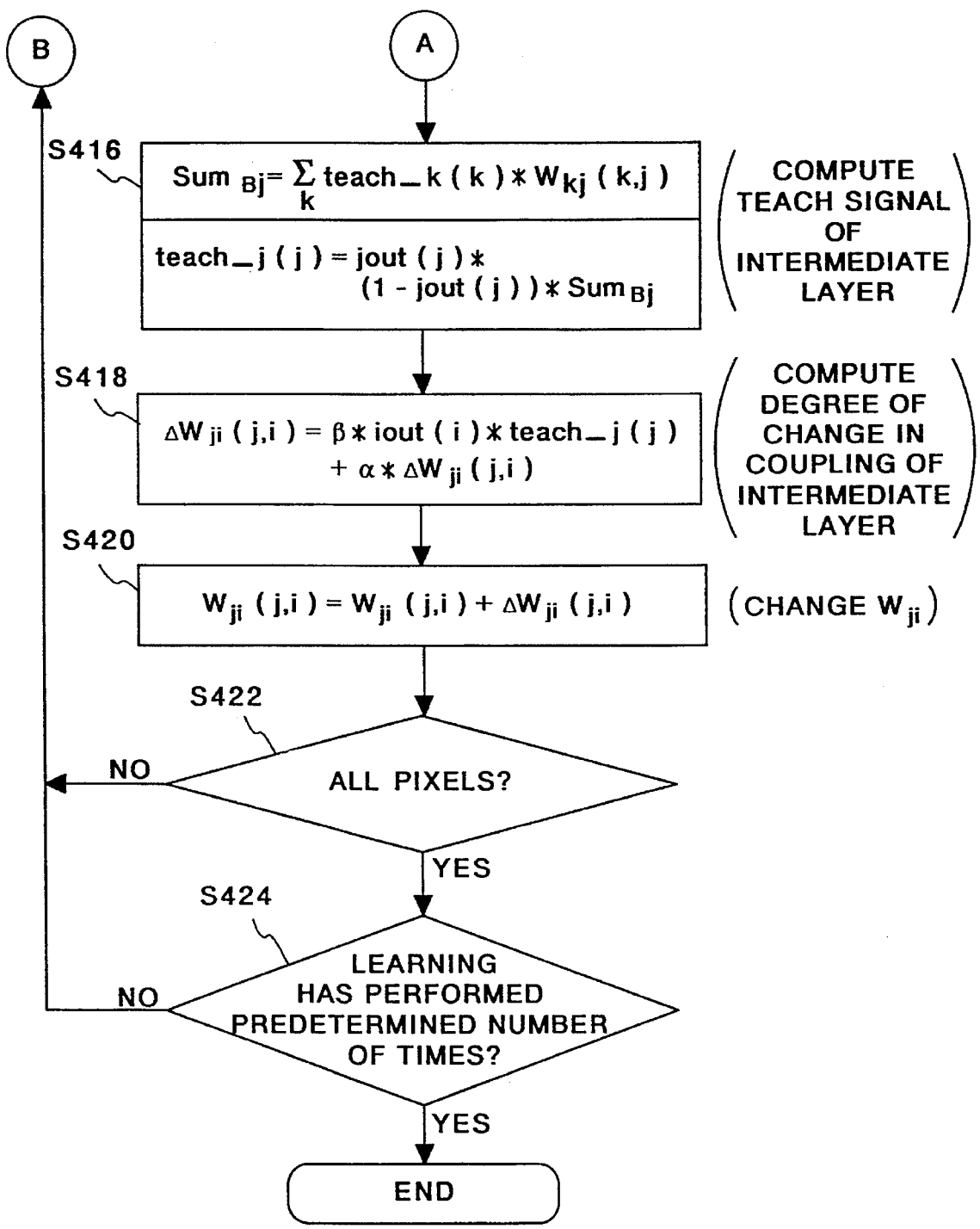

The learning operation by the two neural networks (for half-tone images and character images) of the restoring unit 112 and the learning operation by the two networks (503 and 506) of the discriminator 113 both use the back-projection method. Accordingly, the principles employed in these teaching operations are the same. The only difference is the data used in learning. FIGS. 12A and 12B, described below, are flowcharts of the learning procedures of these networks.

Learning in the Restoring Unit

The restoring unit 112 restores multi-level image data from binary image data. In a neural network in accordance with the back-projection method for this purpose, multi-level image data and binarized data obtained by previously converting this multi-level image data by the ERD method (this method is the binarizing processing method of the transmitting unit in FIG. 3) are necessary in order to perform learning. As shown in FIG. 4B, during the learning process, the multi-level image data is used as so-called "ideal output data", while the binarized image data which has been binarized from the multi-level image data is inputted to the network as "input data" to the network, and a so called "teach signal" is generated. The foregoing data is sample data for learning and must be prepared prior to learning.

Next, the coupling strengths $W_{ji}$, $W_{kj}$ are initially decided in suitable fashion. After the initial values have been suitably decided, the above-mentioned binary image data is inputted as learning data to the networks coupled based upon the initial values, and the outputted multi-level image data (kout) is obtained. This output and the original multi-level image data serving as the ideal output are compared, and the teach signal is generated based upon the comparison. This process is illustrated as the process ① → ② (forward direction) in FIG. 4B. Based upon the teach signal, the coupling strengths $W_{ji}$, $W_{kj}$ are corrected while learning is performed in accordance with the back-projection method. This process is illustrated as the process ③→④ (backward direction) in FIG. 4B. When this learning is repeated, the coupling strengths $W_{ji}$, $W_{kj}$ are corrected as being suitable for the binary image data→ multi-level image data conversion (restoration). The outputs in accordance with the coupling strengths $W_{ji}$, $W_{kj}$ determined as the result of learning are stored as table values in the tables $T_1$ through $T_n$ indicated at $400_1$ through $400_n$ in FIG. 7.

The procedure for learning by the neural network for half-tone image restoration in the restoring unit will be described in detail with reference to FIGS. 12A and 12B. The principles of the procedure shown in FIGS. 12A and 12B are applied to learning by the network for the character image in the restoring unit 112 and to learning by the two neural networks in the discriminator 113.

Step S402 calls for applying initial values to the weighting coefficient $W_{ji}$ indicating the strength of the connection between the input layer and the intermediate layer and to the weighting coefficient $W_{kj}$ indicating the strength of the connection between the intermediate layer and the output layer. Values in the range of from −0.5 to +0.5 are selected as initial values, taking convergence of the learning process into consideration. A pixel at any position is selected as a pixel of interest (the position indicated by "*" in FIG. 6B) from the input data for learning. Steps S404 through S406 represent a procedure for setting the input data and output data of the neural network. Specifically, at step S406, image data iout (i) (i=1–9) within a 3×3 area in which the pixel of interest is the center is set in the input layer. At step S408, multi-level image data (ideal-out) serving as an ideal output corresponding to the pixel of interest is prepared. Step S410 indicates a procedure for computing an output kout (k) based upon the given weighting coefficients.

Specifically, the i-th item of data iout (i) from the input layer is multiplied by the weighting coefficient $W_{ji}$ of the intermediate layer, and the total sum regarding i is computed as follows:

$$Sum_{Fj} = \sum_i W_{ji}(j,i) * iout(i) \qquad (1)$$

Next, the j-th output jout (j) of the intermediate layer is computed in accordance with $$jout(j) = \frac{1.0}{1.0 + \exp(-Sum_{Fj})} \qquad (2)$$

using the sigmoid function in order to obtain this output in a form normalized to 0/1. Here F of $Sum_{Fj}$ means forward. Similarly, the output value kout from the intermediate layer to the output layer is obtained as follows: First, as in (1) above, the total sum of the products of the coefficient $W_{kj}$ of the output layer and the output value jout (j) from the intermediate layer is found, and the value $Sum_{Fk}$ is obtained.

$$Sum_{Fk} = \sum_j W_{kj}(k,j) * jout(j) \qquad (3)$$

Next, the output kout (k) of the output layer is obtained in accordance with $$kout(k) = \frac{1.0}{1.0 + \exp(-Sum_{Fk})} \qquad (4)$$

using the sigmoid function in order to obtain this output in a form normalized to 0/1.

Computation in the forward direction with regard to one set of sample data is thus completed. The following is the computation in the backward direction, namely a procedure for correcting the coupling strengths by learned values from sample data comprising a set of the above-mentioned input and ideal output:

Step S412 calls for comparing the output value kout, which is computed from the initial values (set at step S402) $W_{ji}$, $W_{kj}$ in accordance with Eqs. (1)–(4), with the ideal output ideal-out (k) prepared in advance. More specifically, as a result of this comparison, the teach signal teach-k(k) of the output layer is computed in accordance with the following:

$$teach\text{-}k\ (k) = \{ideal_{13}out\ (k) - kout\ (k)\} * kout\ (k) * \{1 - kout\ (k)\} \quad (5)$$

It should be noted that kout (k)*{1−kout (k)}in Eq. (5) has the meaning of a differentiated value of the sigmoid function. Next, the degree of change $\Delta W_{kj}$ (k,j) in the coupling of the output layer is found at step S414. That is, $$\Delta W_{kj}\ (k,j) = \beta jout\ (j) * teach_{13}\ k\ (k) + \alpha * \Delta W_{kj}(k,j) \quad (6)$$

Here α (a stabilizing coefficient) and β (a learning coefficient) are fixed values. These coefficients are made 0.5 in this embodiment. The coefficients α, β function to suppress the above-mentioned $\Delta W_{kj}$ (k,j). The coupling coefficient $\Delta W_{kj}$ (k,j) between the intermediate layer and the output layer is updated, i.e., learned, at step S415 in accordance with the following equation based upon the degree of change $\Delta W_{kj}$ (k, j):

$$W_{kj}\ (k,j) = \Delta W_{kj}\ (k,j) + W_{kj}\ (k,j) \quad (7)$$

Next, the teach signal $teach_{13}j$ (j) of the intermediate layer is computed at step S416. Specifically, the contribution in the backward direction from the output layer in each neutral network of the intermediate layer is computed based upon $$Sum_{Bj} = \sum_{k} teach\_k(k) * W_{kj}(k,j) \quad (8)$$

This contribution is normalized in accordance with the following equation using the differentiated value of the sigmoid function, thereby computing the teach signal teach-j (j) of the intermediate layer:

$$teach\text{-}j\ (j) = jout\ (j) * \{1 - jout\ (j)\} * Sum_{Bj} \quad (9)$$

It should be noted that $teach_{13}j$ (j) of Eq. (9) has the meaning of an ideal signal in the intermediate layer.

Next, at step S418, the degree of change ΔWji (j,i) in the coupling of the intermediate layer is computed using this teach signal teach_j (j). More specifically, the following operation is performed:

$$\Delta W_{ji}\ (j,i) = \beta * iout\ (i) * teach\_j\ (j) + \alpha * \Delta W_{ji}\ (j,i) \quad (10)$$

The degree of coupling $W_{ji}$ (j,i) is updated at step S451. That is, the following operation is performed:

$$W_{ji}\ (j,i) = W_{ji}\ (j,i) + \Delta W_{ji}\ (j,i) \quad (11)$$

Thus, multi-level image data of one pixel of interest is made an ideal output ideal_out, and the coupling coefficients Wji, Wkj are learned from the ideal output, the binarized image data corresponding thereto, and the restored multi-level image data obtained from the surrounding nine-pixel binarized image data. Next, it is determined at step S422 whether this operation has been performed with regard to all pixels of interest (all sets of sampled data), and the procedure of steps S404 through S451 is repeated until the operation is executed for all sets of sampled data.

Since accuracy is believed to be low if learning regarding all sets of sampled data is performed only once, the processing of steps S404 through S422 is repeated until accuracy is found to be high at the decision of step S424.

It should be noted that it is better if the pixel of interest designated at step S404 is designated randomly rather than sequentially.

Thus, the coupling constants in the neural network of the restoring unit 112 of FIG. 3 are decided so as to be optimum for the conversion from the binary image to the multi-level half-tone image, and the tables T1 through Tn are decided in accordance with the values of these coupling constants.

The coupling constants for the conversion from the binary image to the multi-level character image in the restoring unit also are decided in the same manner as in FIGS. 12A and 12B. In this case, the sample of the input binary image data used in learning is that obtained by binarizing the multi-level character image, which has been prepared in advance, by means of a predetermined threshold-level matrix. The above-mentioned multi-level character image is used as the ideal output.

Learning in the Image Discriminator

The conversion table 503 of the discriminator 113 and the network 506 for image discrimination will now be described.

FIGS. 13A through 13D are sampled data used in learning for the discriminator 113. First, the creation of these items of sampled data will be described.

Figure 14:
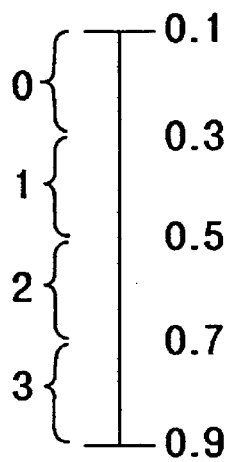
FIG. 14 is a diagram for describing a quaternary (four-level) conversion in the image discriminator 113.

FIG. 13A is a diagram of an original multi-level image, in which an area 600 mainly contains a character image and an area 601 mainly contains a half-tone image. FIG. 13B is a diagram in which the multi-level image of FIG. 13A has been converted into a four-level image. In making this four-level conversion, the density of each pixel in the range 0–255 represented by eight bits is normalized to the range 0.1–0.9 by the sigmoid function of FIG. 8, whereupon the values of 0.1–0.9 are four-level converted according to the correspondence shown in FIG. 14. As a result of this four-level conversion, the character-image area 600 of the original image is converted into a four-level image area 602, and the half-tone image area 601 is converted into a four-level image area 603.

FIG. 13C is the result of binarizing the multi-level image of FIG. 13A using a predetermined matrix. In making this binary conversion, different matrices (e.g., a fixed threshold-level matrix and a dither matrix) should be used with regard to the areas 600, 601. As a result of this binary conversion, the character-image area 600 of the original image is converted into a binary image area 604, and the half-tone image area 601 is converted into a binary image area 605.

FIG. 13D illustrates the distribution of the results of image discrimination ("0" is allotted to the half-tone image and "1" is allotted to the character image) applied to the original image of FIG. 13A. As a result of this image discrimination, the character-image area 600 of the original image is converted into a distribution area 606, and the half-tone image area 601 is converted into a distribution area 607.

It should be noted that an image suitable for the learning sampled data is an image which always has a location where the density is "0" and a location where the density is "255", and also possesses an edge portion of a character or the like.

FIG. 15 is a flowchart illustrating the learning procedure in the discriminator 113. Steps S500 through S506 represent a procedure for learning the coupling coefficients of the conversion table 503. Steps S510 through S516 represent a procedure for learning the coupling coefficients of the network 506 for image discrimination.

Step S500 of the flowchart calls for preparation of learning binary image data (i-out) (604, 605 in FIG. 13C) to be applied to the FIFO memory 501 of the discriminator 113.

Four-level image data (602, 603; FIG. 13B) is prepared as an ideal output (ideal-out) at step S502. Learning is performed at step S504 in accordance with the procedure of FIGS. 12A and 12B using the learning data. In this case, the input of binary image data (604, 605) to the input layer 511 (FIG. 5B) of the neural network 503 is constituted by the nine pixels in the area of size 3×3 shown in FIG. 9A. The output signal from the output layer 513 of the network 503 is one pixel (three bits), as shown in FIG. 5B. This output signal is contrasted with the ideal output, in which the output corresponding to the position (pixel of interest) illustrated in FIG. 9B of the four-level image data (602, 603) is taken as being the ideal output. Thus, the coupling constants of the neural network 503 (conversion table) are learned and decided.

The image block which is inputted to the network 503 has a size of 3×3, as illustrated in FIG. 9A. In other words, with regard to the input binary image data (FIG. 13C) at the time of learning, it will suffice to prepare four-level image data (FIG. 13B) corresponding to $2^9=512$ patterns. Once the coupling constants of the network 503 have been decided, it is a very simple matter to put the network 503 into the form of a ROM. As for table 503 put into the form of a ROM, it will suffice to adopt the 3×3 block of $2^9=512$ patterns as address inputs.

When the content of the conversion table 503 has thus been decided, the coupling constants obtained by learning are set in the network 503 at step S508. Learning of the network 506 is performed from step S510 onward.

Specifically, learning four-level image data (602, 603; FIG. 13B) for the network 506 is prepared at step S510. Data (606, 607; FIG. 13D) which is the result of image discrimination is prepared as the ideal output at step S512. Learning of the network 506 is performed at step S514 in accordance with the procedure of FIGS. 12A and 12B using the learning data. This learning is repeated until the coupling constant converges (step S516). The coupling constant which has converged is set in the network 506.

When the binary image which includes the half-tone image and character image is inputted to the discriminator 113 of FIG. 5A, the discriminator 113 functions to discriminate the image and output the results of discrimination from the neural network 506.

Figure 16:
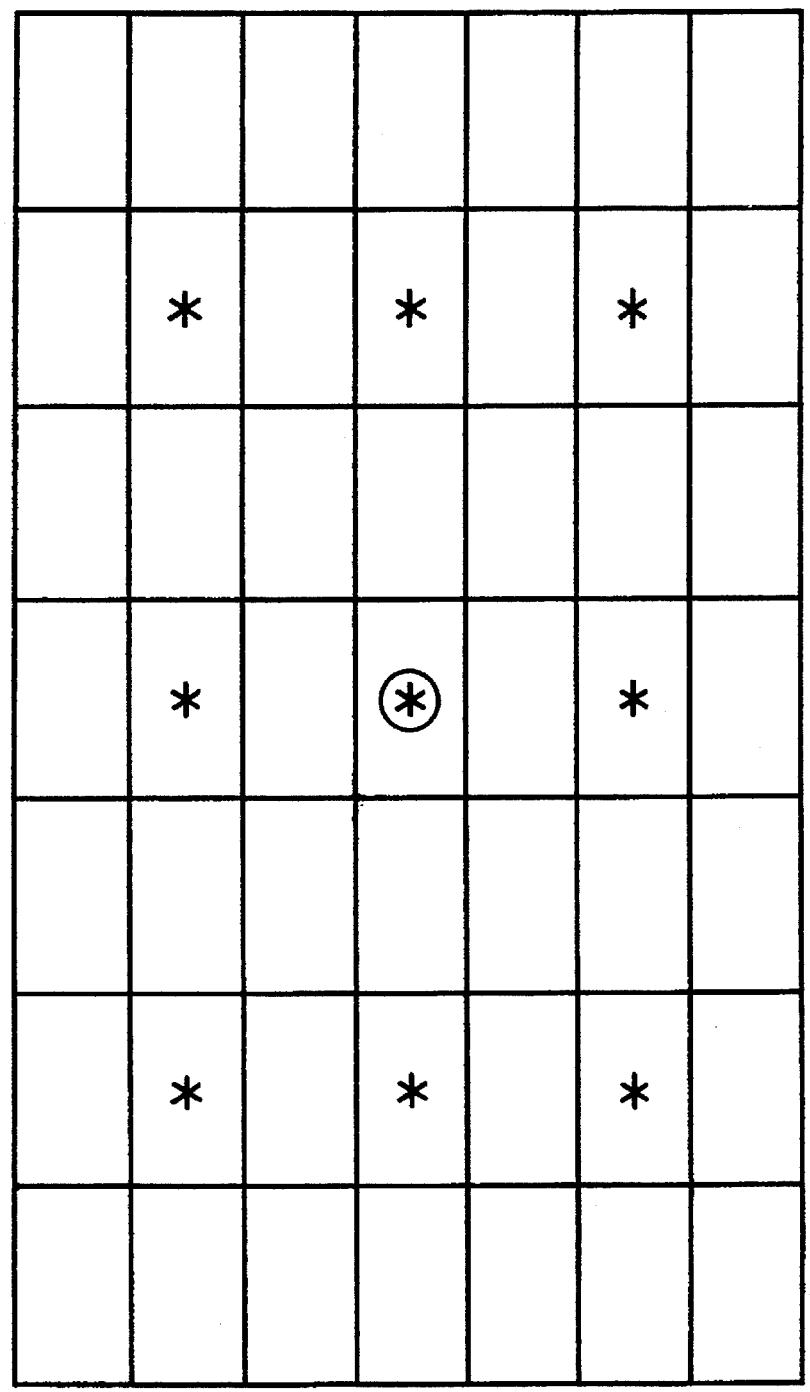
FIG. 16 is a diagram for describing the manner in which a pixel area referred to by a network 506 is substantially enlarged in the image discriminator 113.

The conversion table 503 refers to the 3×3 (=nine pixels) area at learning of the two networks of the image discriminator 113. The network 506 samples and discriminates the four-level image data, which is the output from the conversion table 503, alternately in both the vertical and horizontal directions. More specifically, the area which the network 506 refers to, 7×7=49 pixels is shown in FIG. 16. Pixels sampled are indicated by * and the pixel of interest by "(*)" in FIG. 16. Since the image discriminator 113 uses two neural networks, the learning of these networks ultimately is carried out upon referring to an area of large size, and therefore the accuracy of this learning (in effect, the discriminating accuracy of image discrimination) is improved. Moreover, with regard to learning of the two networks taken individually, it will suffice only to refer to an area of size 3×3, and therefore learning speed is raised greatly.

FIG. 17 is a detailed view of the selector 114 and illustrates the connections between the selector 114 and the restoring unit 112 and discriminator 113. Since the amount of delay in the discriminator 113 is greater than that of the restoring unit 112, a timing adjuster 120 adjusts this delay. Depending upon the output of the discriminator 113, a multiplexer 121 selects one of the two outputs (restoration as a half-tone image and restoration as a character image) from the restoring unit 112, whose timing has been adjusted.

<Other Method of Multi-level Image Restoration>

The restoring unit 112 of FIG. 3 (FIG. 4A) restores the multi-level image from the binary image by referring to the 3×3 area. However, the following practical problem arises: With a window size on the order of 3×3, it is possible for all of the binary image data within the window to be "0", even if the density is not "0" when the original multi-level image has 0–255 tones. In addition, the opposite case is possible, in which all of the binary image data is "1", even if the density of the original multi-level image is not all "255". Accordingly, in the apparatus of the embodiment shown in FIG. 3, restoration accuracy inevitably is low since the size of the window is 3×3, which is small. If the arrangement is such that a large window is used, a highly accurate conversion (restoration) from a binary image to a half-tone image will be possible. However, making the window large in size results in a longer back-propagation learning time of the neural network and a longer execution processing time. Therefore, a new problem arises, namely the fact that realistic processing is difficult to execute with an ordinary computer processing speed.

As a modification of image restoration described next, there is provided an improved binary level→multi-level conversion method in which both high-speed processing at learning and higher restoration accuracy (learning accuracy) are obtained.

Figure 18:
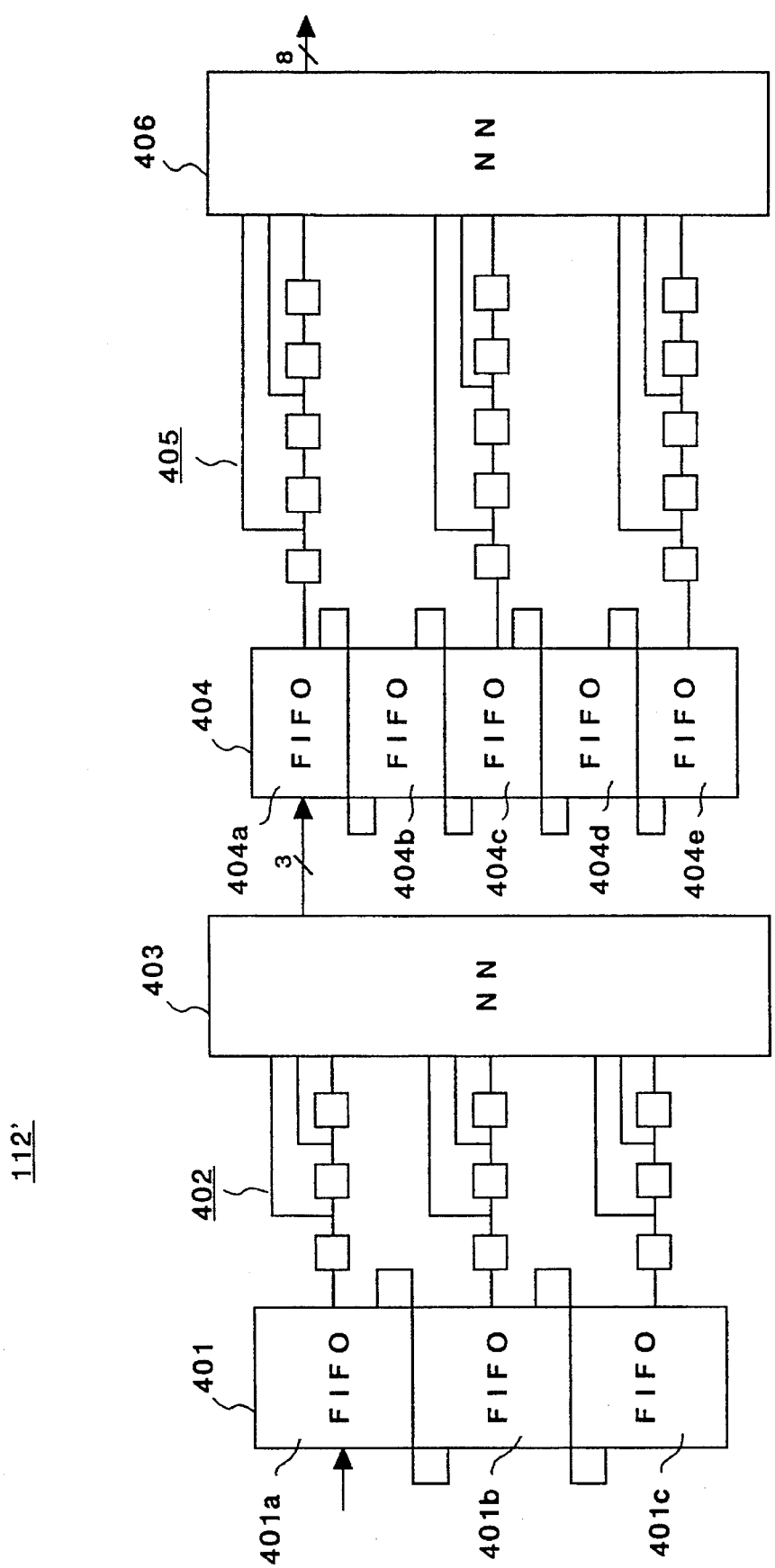
FIG. 18 is a block diagram illustrating the construction of another embodiment of the restoring unit.

FIG. 18 illustrates the construction of a restoring unit 112' according to this improvement.

Figure 20A:
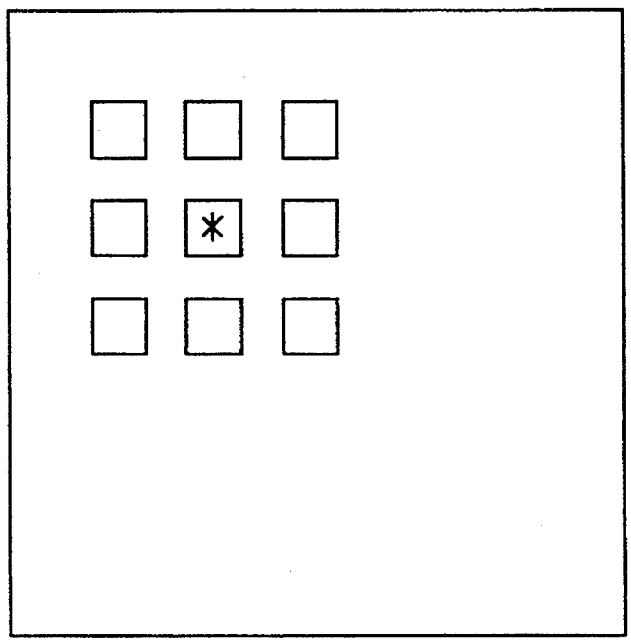
Figure 20B:
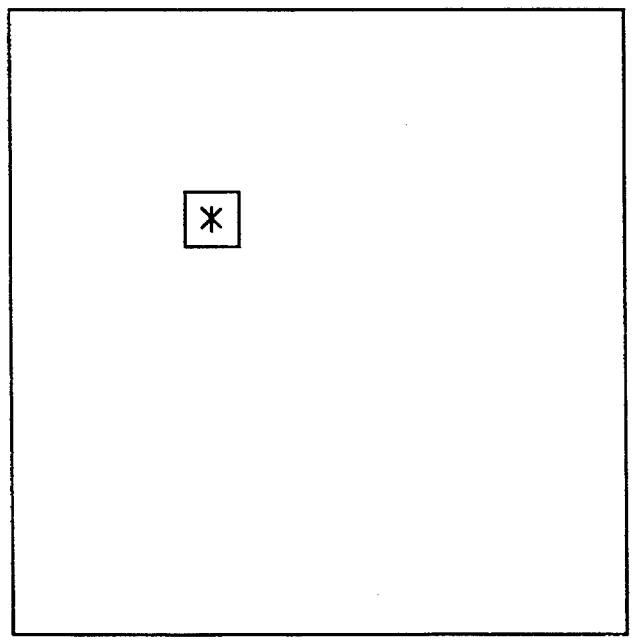

As will be readily understood from a comparison of FIG. 18 and FIG. 5A, the restoring unit 112' according to this improvement is substantially the same as that of the discriminator 113 in terms of construction. By way of example, the concrete construction of the two networks (403, 406) in FIG. 18 is substantially the same as that of the network in FIG. 4B or FIG. 5B. The reproducing unit 112' aims at achieving the same effects, as when the size of the reference area for image discrimination is increased, in apparent terms, by adopting a two-stage structure for the neural networks in the discriminator 113. More specifically, the reproducing unit 112' has two neural networks 403, 406, and the former network 403 refers to the binary image data of the 3×3 area (FIG. 20A) to output eight-level image data (FIG. 20B). The network 406 outputs multi-level image data (FIG. 20B) upon referring to the output eight-level image data of network 403 in the vertical and horizontal directions, as shown in FIG. 20A, every other pixel. This multi-level image data is the restored image data.

Figure 21:
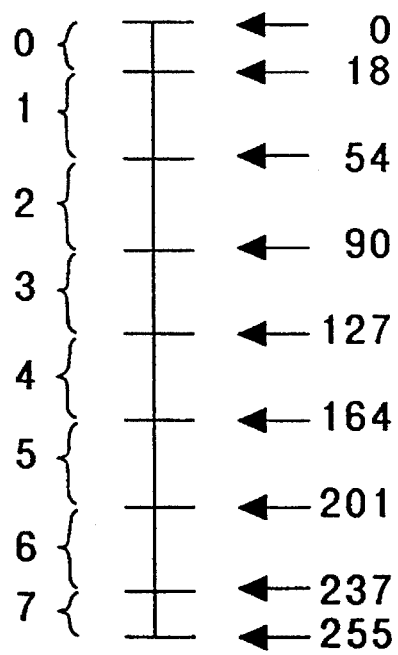
FIG. 21 is a diagram for describing a technique for performing an eight-level conversion in the embodiment of FIG. 18.

FIGS. 22A through 22C illustrate the sampled data used in teaching for the reproducing unit 112' FIG. 22A is a diagram of an original multi-level image, in which an area 650 mainly contains includes a character image and an area 651 mainly contains a half-tone image. FIG. 22B is a diagram in which the multi-level image of FIG. 22A has been converted into an eight-level image. In making this eight-level conversion, the density of each pixel in the range 0–255 represented by eight bits is eight-level converted according to the correspondence shown in FIG. 21. As a result of this eight-level conversion, the character-image area 650 of the original image is converted into an eight-level image area 652, and the half-tone image area 651 is converted into an eight-level image area 653.

FIG. 22C is the result of binarizing the multi-level image of FIG. 22A using a predetermined matrix. In making this binary conversion, different matrices should be used with regard to the areas 650, 651. As a result of this binary conversion, the character-image area 650 of the original image is converted into a binary image area 654, and the half-tone image area 651 is converted into a binary image area 655.

Figure 23:
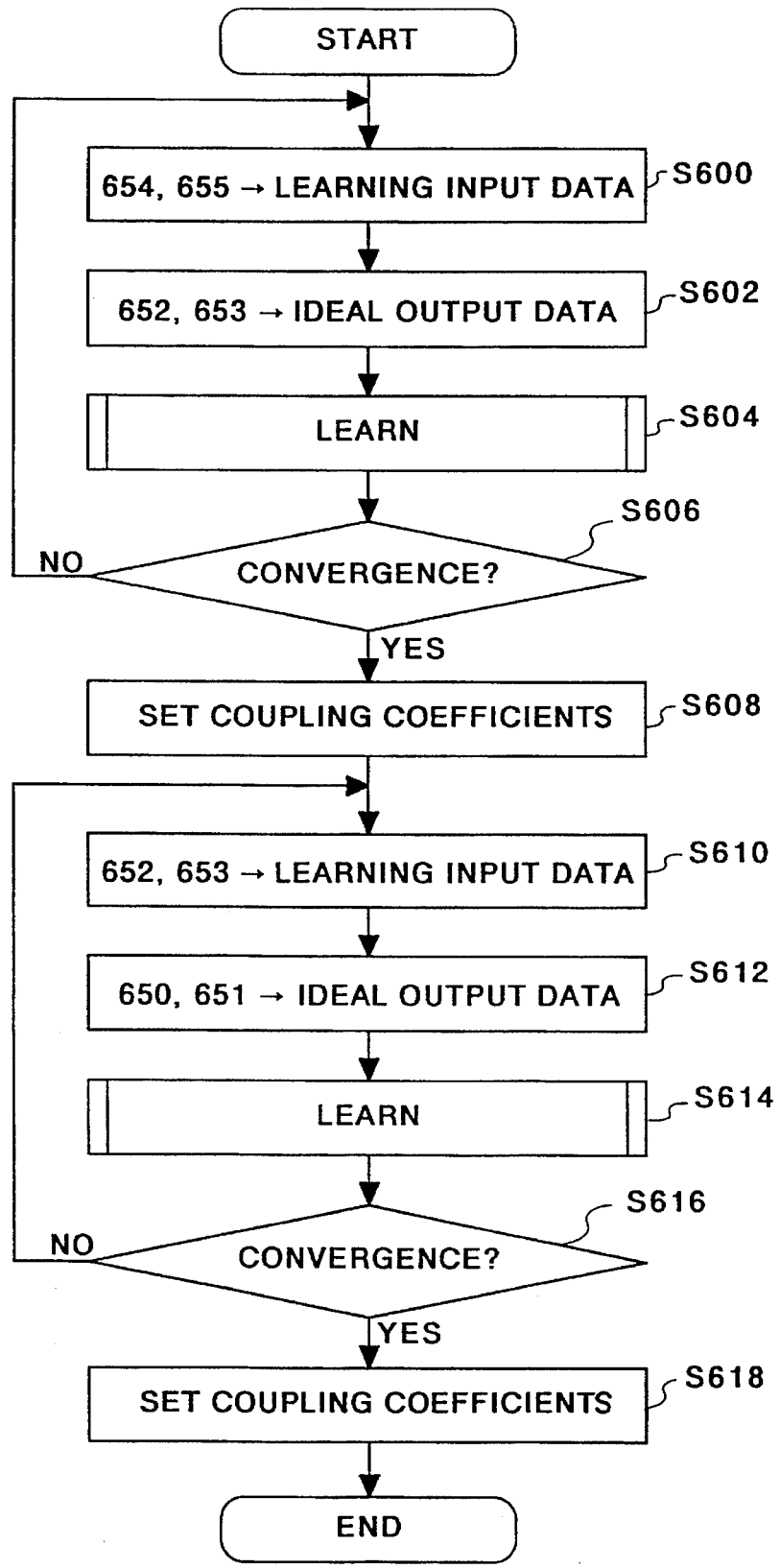
FIG. 23 is a flowchart for describing the procedure of a learning process used in the embodiment of FIG. 18.

FIG. 23 is a flowchart illustrating the learning procedure in the restoring unit 112'. Steps S600 through S606 represent a procedure for learning the coupling coefficients of the conversion table 403. Steps S610 through S616 represent a procedure for learning the coupling coefficients of the network 406.

Figure 19A:
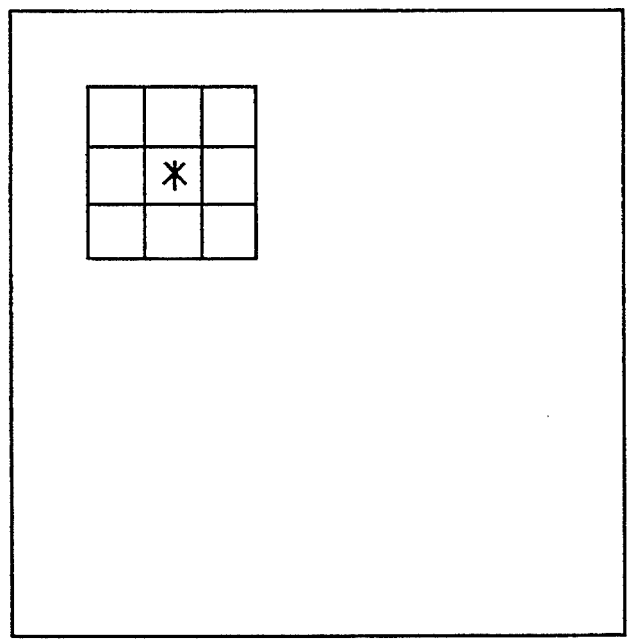
FIGS. 19A, 19B, 20A and 20B are diagrams for describing the structure of outputted image data which enters two neural networks 403, 406 in the embodiment of FIG. 18.
Figure 19B:
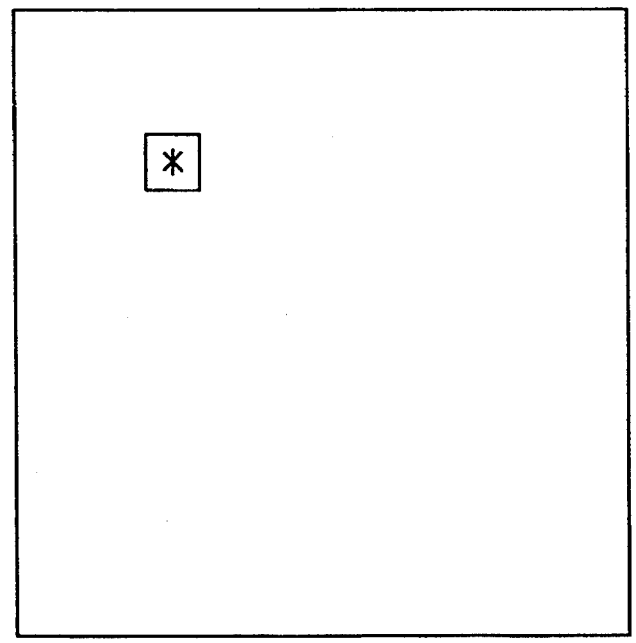

Step S600 of the flowchart calls for preparation of learning binary image data (i-out) (654, 655 in FIG. 22C) to be applied to the FIFO memory 401 of the reproducing unit 112'. Eight-level image data (652, 653; FIG. 22B) is prepared as an ideal output (ideal-out) at step S602. Learning is performed at step S604 in accordance with the procedure of FIGS. 12A and 12B using the learning data. In this case, the input of binary image data (654, 655) to the input layer 511 (FIG. 5B) of the neural network 403 is constituted by the nine pixels in the area of size 3×3 shown in FIG. 19A. The output signal from the output layer 513 of the network 403 is one pixel (three bits), as shown in FIG. 19B. This output signal is contrasted with the ideal output, in which the output corresponding to the position (pixel of interest) illustrated in FIG. 9B of the eight-level image data (652, 653) is taken as being the ideal output. Thus, the coupling constant W of the neural network 403 (conversion table) is learned and decided.

When the content of the conversion table 403 has thus been decided, the coupling constant obtained by learning is set in the network 403 at step S608. Learning of the network 406 is performed from step S610 onward.

Specifically, learning eight-level image data (652, 653; FIG. 22B) for the network 406 is prepared at step S610. Multi-level image data (650, 651; FIG. 22A) is prepared as the ideal output at step S612. Learning of the network 406 is performed at step S614 in accordance with the procedure of FIGS. 12A and 121B using the learning data. This learning is repeated until the coupling constant converges (step S616). The coupling constant which has converged is set in the network 406.

When the binary image which includes the half-tone image and character image is inputted to the restoring unit 112' at the end of learning thus performed, the restoring unit 112' functions to restore the multi-level image data and output this data from the neural network 406.

The conversion table 403 refers to the 3×3 (=nine pixels) area at the time of learning. The network 406 samples the eight-level image data, which is the output from the conversion table 403, in both the vertical and horizontal directions every other pixel. More specifically, the area which the network 406 refers to is 7×7=49 pixels about the pixel of interest, described in connection with FIG. 16. That is, using neural networks coupled in two series raises learning accuracy (restoration accuracy) and learning efficiency for the same reason as described in connection with the image discriminator 113 described above.

<Advantages of the Embodiment>

The embodiment described above provides the following advantages:

(1) Since a binary image is restored to a multi-level image using a neural network, the accuracy of the restoration is high. The more the precision of learning is raised, the higher this accuracy becomes. In addition, once learning has been performed, restoration in the network involves simple conversion processing and essentially is executed at high speed.

(2) Since image discrimination is carried out using a neural network, the image discrimination is accurate and high in speed. In addition, image discrimination is performed by a neural network having a two-stage construction, as illustrated in FIG. 5A. Therefore, though the number of pixels referred to when image discrimination is performed is small in apparent terms, the number is substantially large to make possible highly accurate image discrimination. Moreover, by adopting the two-stage construction, a small number of input elements in the individual neural networks suffices and, as a result, the time needed for learning of the networks is short.

(3) In accordance with the improved apparatus relating to the restoration from the binary image to the multi-level image, the neural network used has a two-stage construction. This greatly increases the number of pixels referred to and furnishes a restored multi-level image having excellent image quality. By adopting the two-stage construction, a small number of input elements in the individual neural networks suffices and, as a result, the time needed for learning is short.

<Modifications>

The present invention can be modified in various ways without departing from the scope of the claims.

Modification 1:

In the embodiment described above, the image discriminator 113 discriminates the image areas of the input binary image data and, in dependence upon the results of the discrimination, the selector 114 selects a multi-level image as the character image or a multi-level image as the half-tone image. However, the technique for the binary level→multi-level restoration essentially does not require image discrimination. The reason for this is that since both the character-image area and half-tone image area in the image are learned within a certain binary-image area in the learning process, half-tone areas also can be reproduced smoothly without blurring of character portions even in case of multi-level conversion. By contrast, in the prior art, a method has been contemplated in which it is determined whether a certain image area is a character or half-tone image (i.e., image discrimination is performed), and a multi-level restoration is executed adaptatively in dependence upon the determination. Though some effects can be expected with this adaptive processing, as in the embodiment of FIG. 3, there is also a high degree of image deterioration due to misjudgment. For reasons such as these, the conventional adaptive processing is difficult to practice and the effects thereof are much poorer than those of the method of this embodiment even if such processing can be realized.

More specifically, the present method using neural networks is not adaptive processing based upon division into a several stages or steps. Rather, the method of the invention is characterized by stepless adaptive processing referred to as learning (where the number of cases is extremely large, although limited), and therefore the probability of misjudgment is very small.

Modification 2:

In the foregoing embodiment, a case is described in which the input is 3×3 pixels and the output pixel is one. However, the present invention is not limited to this number, and there is no limitation upon the numbers of inputs and outputs. The technique involved is exactly the same as that described above. For example, the inputs can be 5×7, and the number of outputs can be 3×3.

Modification 3:

A two-level→multi-level conversion is described above. However, the image from which the conversion is made is not limited to a binary image. It is self-evident that a conversion from N-level data (where N is less than the multi-level number of the original image) can be realized in the same manner as described above. In addition, it is self-evident that the same arrangement can be adopted even if the multi-level data after conversion is converted into another M level (M>N) and not the same multi-level number of the original image.

Figure 25A:
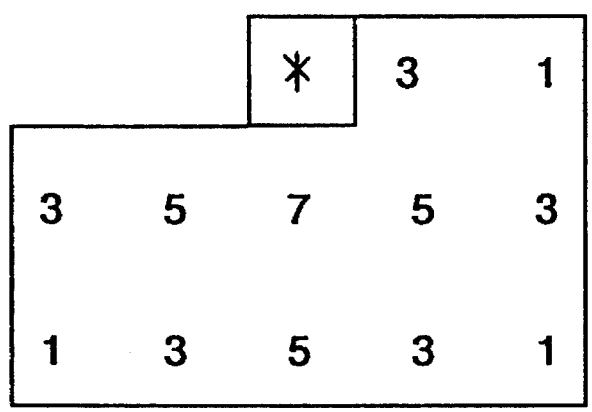
FIGS. 25A and 25B are diagrams respectively illustrating error flow and the positions of reference pixels in a case where the binary converting method is an error diffusion method.
Figure 25B:
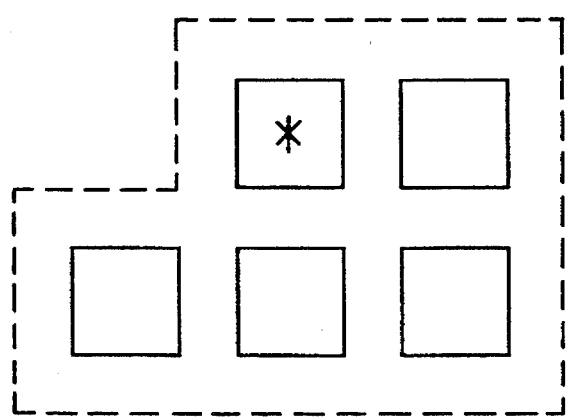

Modification 4:

In the modified example of FIG. 18, the single-stage eight-level conversion can be replaced by a smoothing filter instead of relying upon two-stage neural network processing. In addition, if the number of reference pixels involved in the second-stage network is limited to five, as shown in FIGS. 24B, 24C, rather than the nine pixels shown in FIG. 24A, a 256-tone conversion in the second-stage network 406 also is on the order of $8^5=2^{15}$, and a conversion to a look-up table also is possible. This will make possible a further reduction in processing time. In a case where tone processing is executed by referring to the pixels at the above-mentioned five locations, it is necessary to select five pixels in dependence upon the binarizing processing method applied to this binary image. That is, in a case where the original image is binarized by the dither method or the like, it is necessary to select the error flow (see FIG. 25A). In other words, though no problems are encountered in a case where binarizing is performed as by the dither method, it is necessary to select five pixels (FIG. 25B) upon considering the error flow (FIG. 25A) in a case where binarizing is performed as by the error diffusion method.

Modification 5:

Though the foregoing embodiment relates to a facsimile apparatus, applying the half-tone image restoration method of the invention to a copying apparatus will make it possible to execute fully satisfactory half-tone image restoration processing even at the processing speed of conventional copying apparatus.

Modification 6:

In the foregoing embodiment, a case is described in which a first stage of a four-level conversion is executed by the conversion table 503. However, it is permissible to use a smoothing filter in the four-level conversion performed by the first-stage neural network. With regard also to the image discrimination performed by the second-stage network, the input pattern from the nine reference pixels is on the order to $4^9=2^{18}$, and therefore conversion to a look-up table is possible. This makes possible a further reduction in the time needed for image discrimination processing.

Modification 7;

It is permissible to apply the present invention to one system comprising a plurality of devices, or to an apparatus comprising a single device. Also, it goes without saying that the present invention can be applied to a case where it is achieved by supplying a program to a system or apparatus.

The present invention is not limited to the above embodiments and various changes and modifications can be made within the spirit and scope of the present invention. Therefore, to apprise the public of the scope of the present invention, the following claims are made.

What is claimed is:

1. An image processing method for restoring input N-level image data to M-level image data by estimating an original image, said method comprising the steps of:

determining coupling coefficients between neurons of a neural network by repeatedly performing the following steps (a)–(e):

(a) selecting a first object pixel of N-level image data, M-level image data corresponding to which is known;

(b) inputting the selected first object pixel and surrounding pixels of the first object pixel of the N-level image data to input neurons of the neural network as input image data, each of the input neurons having been previously determined to input specific data of the first object pixel and the surrounding pixels;

(c) inputting a second object pixel of the M-level image data corresponding to the first object pixel of the N-level image data as an ideal output for said input image data to the neural network;

(d) comparing an output of the neural network with the ideal output; and (e) correcting the coupling coefficients on the basis of a result of the comparison;

successively selecting each of the pixels of an N-level image to be restored as a third object pixel;

inputting the selected third object pixel and surrounding pixels of the third object pixel of the N-level image to the respective input neurons of the neural network; and outputting output image data of the neural network corresponding to the third object pixel as an estimated M-level image.

2. The method according to claim 1, wherein N=2.

3. The method according to claim 1, wherein the N-level image data for said determining step, and which is the object of restoration, is a binary-pixel block having a size of m×n pixels.

4. The method according to claim 1, wherein said determining step of said neural network is performed based upon a back-propagation method.

5. The method according to claim 1, wherein the N-level image data for said determining step, and which is the object of restoration, is N-level-converted using a density-preserving-type N-level conversion method.

6. The method according to claim 1, wherein said method further comprises the steps of preparing the M-level image for a half-tone image, the M-level image data for a character image, the N-level image data for a half-tone image, and the N-level image data for a character image;

performing learning using M-level image data and N-level image data of the half-tone image and the character image, respectively;

restoring the input N-level image data as a half-tone image and as a character image; and determining whether an image area of the input N-level image data belongs to the half-tone image or to the character image and selecting accordingly, an image restored as a half-tone image or an image restored as a character image.

7. An image processing method for converting N-level image data into M-level image data corresponding to the N-level image, comprising the steps of:

determining coupling coefficients between neurons of a first neural network by repeatedly performing the following steps (a)–(e):

(a) selecting a first object pixel of N-level image data, m-level (N<m<M) image data corresponding to which is known;

(b) inputting the selected first object pixel and surrounding pixels of the first object pixel of the N-level image data to input neurons of the first neural network as input image data, each of the input neurons of the first neural network having been previously determined to input specific etude of the first object pixel and surrounding pixels;

(c) inputting a second object pixel of the m-level image data corresponding to the first object pixel of the N-level image data as an ideal output for the input N-level image data to the first neural network;

(d) comparing an output of the first neural network with the m-level image data input as the ideal output; and (e) correcting the coupling coefficients on the basis of a result of the comparison in step (d);

determining coupling coefficients between neurons of a second neural network by repeatedly performing the following steps (f)–(j):

(f) selecting a third object pixel of m-level image data, M-level image data a corresponding to which is known;

(g) inputting the selected third object pixel and discrete surrounding pixels of the third object pixel of the m-level image data to input neurons of the second neural network as input image data, each of the input neurons of the second neural network having been previously determined to input specific data of the third object pixel and surrounding pixels;

(h) inputting a fourth object pixel of the M-level image data corresponding to the third object pixel of the m-level image data as an ideal output for the input m-level image data to the second neural network;

(i) comparing an output of the second neural network with the M-level image data input as the ideal output; and (j) correcting the coupling coefficients on the basis of a result of the comparison in step (i);

successively selectively selecting each of the pixels of the N-level image data to be converted as a fifth object pixel;

inputting the selected fifth object pixel and surrounding pixels of the fifth object pixel of the N-level image data to the respective input neurons of the first neural network;

outputting image data from the first network as sixth pixel data of m-level image data corresponding to the fifth object pixel of N-level image data;

inputting the sixth object pixel and discrete surrounding pixels of the sixth object pixel of the m-level image to the respective input neurons of the second neural network; and outputting image data from the second neural network as M-level image data corresponding to the fifth object pixel of N-level image data.

8. The method according to claim 7, wherein each of the fifth object pixels and surrounding pixels of the respective fifth object pixels compose a continuous image area, and the union of the fifth object pixels and surrounding pixels of the fifth object pixels wherein each of the fifth object pixels is corresponding to the sixth object pixels and discrete surrounding pixels of the sixth object pixel compose a continuous image area.

9. An image processing method for restoring input N-level image data to M-level image data corresponding to the N-level image, comprising the steps of:

determining coupling coefficients between neurons of a first neural network by repeatedly performing the following steps (a)–(e):

(a) selecting a first object pixel of N-level half-tone image data, M-level half-tone image data corresponding to which is known;

(b) inputting the selected first object pixel and surrounding pixels of the first object pixel of the N-level half-tone image data to input neurons of the first neural network as input image data, each of the input neurons of the first neural network having been previously determined to input specific data of the first object pixel and surrounding pixels;

(c) inputting a second object pixel of the M-level image data corresponding to the first object pixel of the N-level image data as an ideal output for the input N-level half-tone image data to the first neural network;

(d) comparing an output of the first neural network with the M-level halftone image data input as the ideal output; and (e) correcting the coupling coefficients on the basis of a result of the comparison in step (d);

determining coupling coefficients between neurons of a second neural network by repeatedly performing the following steps (f)–(j):

(f) selecting a third object pixel of N-level character image data, M-level character image data corresponding to which is known;

(g) inputting the selected third object pixel and discrete surrounding pixels of the third object pixel of the N-level character image data to input neurons of the second neural network as input image data, each of the input neurons of the second neural network having been previously determined to input specific data of the third object pixel and surrounding pixels;

(h) inputting a fourth object pixel of the M-level character image data corresponding to the third object pixel of the N-level character image data as an ideal output for the input N-level image data to the second neural network;

(i) comparing an output of the second neural network with the M-level character image data input as the ideal output; and (j) correcting the coupling coefficients on the basis of a result of the comparison in step (i);

determining coupling coefficients between neurons of a third neural network by repeatedly performing the following steps (k)–(o):

(k) selecting a fifth object pixel of N-level image data including half-tone image and character image data, M-level image data corresponding to which and areas of half-tone image and character image data are known;

(1) inputting the selected fifth object pixel and surrounding pixels of the first object pixel of the N-level image data to input neurons of the third neural network as input image data, each of the input neurons of the third neural network having been previously determined to input specific data of the fifth object pixel and surrounding pixels;

(m) inputting data specifying a type of the fifth object pixel of the N-level image data as an ideal output for the input N-level image data to the third neural network;

(n) comparing an output of the third neural network with the ideal output; and (o) correcting the coupling coefficients on the basis of a result of the comparison in step (n);

successively selecting a sixth object pixel of N-level image data to be restored;

inputting the sixth object pixel and surrounding pixels of the sixth pixel of the N-level image data to the first, second and third neural networks, respectively;

determining if the sixth object pixel is half-tone image data or character image data on the basis of output from the third neural network;

outputting image data from the first neural network as M-level image data corresponding to the sixth object pixel of N-level image data if the sixth object pixel is determined to be half-tone image data and outputting image data from the second neural network as M-level image data corresponding to the sixth object pixel of N-level image data if the sixth object pixel is determined to be character image data.

10. The method according to claim 7, wherein discrete surroundings pixels of the sixth object pixel are sampled at a predetermined intervals in the m-level image data.

* * * * *

UNITED STATES PATENT AND TRADEMARK OFFICE
CERTIFICATE OF CORRECTION

PATENT NO.   : 5,495,542

DATED        : February 27, 1996

INVENTOR(S)  : YUKARI SHIMOMURA ET AL.

It is certified that error appears in the above-identified patent and that said Letters Patent is hereby corrected as shown below:

On title page, item,

[56] REFERENCES CITED

U.S. Patent Documents,
"4,803,436" should read --4,803,736--.

COLUMN 4

Line 32, "unit" should read --unit 112;--.
Line 51, "unit" should read --unit 112;--.
Line 53, "12A," should read --12A--.

COLUMN 8

Line 19, "arranged as a 3x3 array" should be deleted and "latch 502" should read --latch 502 arranged as a 3x3 array--.
Line 23, "valve m" should read --value m--.
Line 56, "two stage" should read --two-stage--.
Line 60, "ii items," should read --i items,--.

COLUMN 9

Line 1, "indicates" should read --indicate--.
Line 2, "(amplification," should read --(amplification--.
Line 10, "discriminator" should read --discriminator 113--.
Line 31, "<Learning>" should read --¶ <Learning>--.
Line 52, "so called" should read --so-called--.

UNITED STATES PATENT AND TRADEMARK OFFICE
CERTIFICATE OF CORRECTION

PATENT NO. : 5,495,542

DATED : February 27, 1996

INVENTOR(S) : YUKARI SHIMOMURA ET AL.

It is certified that error appears in the above-identified patent and that said Letters Patent is hereby corrected as shown below:

COLUMN 10

Line 51, "obtained." should read --obtained:--.

COLUMN 11

Line 8, "{ideal$_{13}$out(k)" should read --{ideal__out(k)--.
Line 15, "$\beta$jout (j)*teach$_{13}$k(k)" should read --$\beta$*jout (j)*teach$_{13}$k(k)--.
Line 27, "teach$_{13}$j(j)" should read --teach__j(j)--.
Line 29, "neutral" should read --neural--.
Line 39, "teach-j(j)" should read --teach__j(j)--.
Line 41, "teach$_{13}$j(j)" should read --teach__j(j)--.
Line 62, "S451" should read --S415--.

COLUMN 13

Line 49, "pixels" should read --pixels,--.

COLUMN 14

Line 7, ""0"" should read --"0",--.

COLUMN 15

Line 10, "reproducing" should read --restoring--.

COLUMN 17

Line 44, "to" (first occurrence) should read --of--.

UNITED STATES PATENT AND TRADEMARK OFFICE
CERTIFICATE OF CORRECTION

PATENT NO. : 5,495,542

DATED : February 27, 1996

INVENTOR(S) : YUKARI SHIMOMURA ET AL.

It is certified that error appears in the above-identified patent and that said Letters Patent is hereby corrected as shown below:

COLUMN 18

Line 36, "of" should read --of:--.
Line 66, "etude" should read --data--.

COLUMN 19

Line 12, "a" should be deleted.

COLUMN 20

Line 47, "(1)" should read --(1)--.

COLUMN 21

Line 3, "network;" should read --network; and--.

UNITED STATES PATENT AND TRADEMARK OFFICE
CERTIFICATE OF CORRECTION

PATENT NO. : 5,495,542

DATED : February 27, 1996

INVENTOR(S) : YUKARI SHIMOMURA ET AL.

It is certified that error appears in the above-identified patent and that said Letters Patent is hereby corrected as shown below:

COLUMN 22

Line 6, "a" should be deleted.

Signed and Sealed this

Eighth Day of October, 1996

Attest:

BRUCE LEHMAN

Attesting Officer

Commissioner of Patents and Trademarks